US011019022B1

(12) United States Patent
Thornewell et al.

(10) Patent No.: US 11,019,022 B1
(45) Date of Patent: May 25, 2021

(54) PROCESSING PACKETS WITH RETURNABLE VALUES

(71) Applicant: F5 Networks, Inc., Seattle, WA (US)

(72) Inventors: Peter Michael Thornewell, Seattle, WA (US); Robert Andrew Kovalchik, Seattle, WA (US)

(73) Assignee: F5 NETWORKS, INC., Seattle, WA (US)

( * ) Notice: Subject to any disclaimer, the term of this patent is extended or adjusted under 35 U.S.C. 154(b) by 0 days.

(21) Appl. No.: 16/774,520

(22) Filed: Jan. 28, 2020

(51) Int. Cl.
  *H04L 29/12* (2006.01)
  *H04L 29/08* (2006.01)
  *H04L 9/06* (2006.01)

(52) U.S. Cl.
  CPC ........ *H04L 61/1511* (2013.01); *H04L 9/0643* (2013.01); *H04L 61/2076* (2013.01); *H04L 61/6009* (2013.01); *H04L 67/1002* (2013.01)

(58) Field of Classification Search
  CPC .............. H04L 61/1511; H04L 9/0643; H04L 61/2076; H04L 61/6009; H04L 67/1002; H04L 63/08; H04L 63/12; H04L 63/123; H04L 9/3247; H04L 63/126; H04L 63/1408; H04L 63/1416; H04L 63/1458; H04L 63/1466; H04L 63/1483; H04L 63/1491; H04L 63/164; H04L 63/166; H04L 63/168; H04L 63/20; H04L 63/205; H04L 63/30; H04L 63/302; H04L 63/306; H04L 45/20; H04L 45/7453; H04L 61/6004; H04L 61/6013; H04L 61/6059; H04L 63/0428; H04L 63/10; H04L 63/1425; H04L 67/2804; H04L 67/2819; H04L 67/2823; H04L 67/2828; H04L 67/2833; H04L 67/2842; H04L 67/2852; H04L 67/2857; H04L 67/2871; H04L 67/2876; H04L 67/2888; H04L 67/2889; (Continued)

(56) References Cited

U.S. PATENT DOCUMENTS 7,502,836 B1 *  3/2009  Menditto .......... H04L 29/12113
                                                         709/217
7,620,733 B1 * 11/2009  Tzakikario .......... H04L 61/1511
                                                         709/245

(Continued)

OTHER PUBLICATIONS

European Search Report for corresponding European Patent Application No. 20199352.4, dated Feb. 17, 2021.

(Continued)

*Primary Examiner* — Greg C Bengzon
(74) *Attorney, Agent, or Firm* — Troutman Pepper Hamilton Sanders LLP (Rochester)

(57) ABSTRACT

Technology related to processing network packets with returnable values is disclosed. In one example, a method includes intercepting a Domain Name System (DNS) request including returnable request values in respective request packet fields. A hash function can be used to characterize or modify the intercepted returnable request values. The intercepted DNS request can be forwarded to a DNS server. A DNS response including returnable response values in respective response packet fields can be received. The returnable response values and the hash function can be used to determine whether the DNS response is legitimate. A legitimate DNS response can be forwarded to a client.

17 Claims, 9 Drawing Sheets

(58) Field of Classification Search
CPC ......... H04L 67/2895; H04L 9/14; H04L 9/30;
H04L 9/3236; H04L 9/3239; H04L
9/3242; H04L 9/3249; H04L 9/3252;
H04L 9/3255; H04L 9/3257; H04L
29/12066; H04L 2209/56; H04L 29/06;
H04L 29/12811; H04L 47/10; H04L
63/04; H04L 63/14; H04L 67/28; H04L
67/2847; H04L 67/2885; H04L 69/16;
H04L 69/163; H04L 69/329; G06F 21/55;
G06F 21/6209; G06F 21/64; G06F
21/645; G06F 16/182
See application file for complete search history.

(56) References Cited

U.S. PATENT DOCUMENTS

| | | | |
|---|---|---|---|
| 7,675,854 B2 | 3/2010 | Chen et al. | |
| 7,769,826 B2 | 8/2010 | Gustafsson | |
| 8,347,100 B1* | 1/2013 | Thornewell | H04L 63/08 713/176 |
| 8,613,089 B1* | 12/2013 | Holloway | H04L 63/1458 726/23 |
| 8,739,243 B1* | 5/2014 | Martini | H04L 63/0471 726/1 |
| 8,782,395 B1* | 7/2014 | Ly | H04W 76/11 713/153 |
| 9,270,646 B2* | 2/2016 | Shelest | H04L 61/1511 |
| 9,742,795 B1* | 8/2017 | Radlein | H04L 63/1416 |
| 9,794,281 B1* | 10/2017 | Radlein | H04L 63/1458 |
| 10,038,715 B1* | 7/2018 | Majkowski | H04L 63/1416 |
| RE47,019 E* | 8/2018 | Thornewell | H04L 63/126 |
| 10,230,749 B1* | 3/2019 | Rostami-Hesarsorkh | G06F 21/56 |
| 10,356,038 B2 | 7/2019 | Sharma et al. | |
| 10,362,057 B1* | 7/2019 | Wu | H04L 63/1491 |
| 10,505,985 B1* | 12/2019 | Walter | H04L 63/0236 |
| 10,666,672 B2* | 5/2020 | Arnell | H04L 61/1511 |
| 2003/0135625 A1 | 7/2003 | Fontes et al. | |
| 2006/0075491 A1* | 4/2006 | Lyon | H04L 65/80 726/22 |
| 2010/0268814 A1* | 10/2010 | Cross | H04L 29/12811 709/224 |
| 2011/0320617 A1* | 12/2011 | Annamalaisami | H04L 63/1458 709/228 |
| 2013/0085914 A1* | 4/2013 | McPherson | H04L 63/0823 705/34 |
| 2013/0198065 A1* | 8/2013 | McPherson | H04L 12/1435 705/40 |
| 2014/0047539 A1* | 2/2014 | Holloway | H04L 63/1425 726/22 |
| 2014/0164447 A1 | 6/2014 | Tarafdar et al. | |
| 2014/0310811 A1* | 10/2014 | Hentunen | H04L 61/305 726/23 |
| 2014/0344925 A1* | 11/2014 | Muthiah | H04L 67/2804 726/22 |
| 2015/0026341 A1* | 1/2015 | Blacka | H04L 63/168 709/225 |
| 2016/0218977 A1* | 7/2016 | Lapidous | H04L 61/6013 |
| 2016/0218978 A1* | 7/2016 | Lapidous | H04L 61/6009 |
| 2016/0219013 A1* | 7/2016 | Lapidous | H04L 61/1511 |
| 2016/0255012 A1* | 9/2016 | Mizrachi | H04L 63/101 370/230 |
| 2016/0294773 A1* | 10/2016 | Yu | H04L 63/1425 |
| 2016/0337313 A1* | 11/2016 | Wood | H04L 61/6022 |
| 2017/0048187 A1* | 2/2017 | Tan | H04L 63/00 |
| 2017/0118232 A1* | 4/2017 | Zhou | H04L 61/1511 |
| 2017/0155732 A1* | 6/2017 | Ara jo | H04L 61/6004 |
| 2017/0201537 A1* | 7/2017 | Caldwell | H04L 63/029 |
| 2017/0250997 A1* | 8/2017 | Rostamabadi | H04L 63/1425 |
| 2017/0318035 A1* | 11/2017 | Baughman | G06N 3/08 |
| 2017/0374015 A1* | 12/2017 | Siba | H04L 61/6059 |
| 2018/0019968 A1* | 1/2018 | Redekop | H04L 47/70 |
| 2018/0097631 A1* | 4/2018 | Uppal | H04L 61/6004 |
| 2018/0219833 A1* | 8/2018 | Reddy | H04L 61/1511 |
| 2018/0288091 A1* | 10/2018 | Doron | G06N 5/048 |
| 2018/0343122 A1* | 11/2018 | Spacek | H04L 9/14 |
| 2019/0036871 A1* | 1/2019 | Lapidous | H04L 63/0281 |
| 2019/0173849 A1* | 6/2019 | Lapidous | H04L 63/0428 |
| 2019/0190948 A1* | 6/2019 | Xie | H04L 63/02 |
| 2019/0230038 A1* | 7/2019 | Hughes | H04L 47/2441 |
| 2019/0245875 A1* | 8/2019 | Chen | H04L 29/06 |
| 2019/0280948 A1* | 9/2019 | Abley | H04L 12/46 |
| 2019/0281009 A1* | 9/2019 | Abley | H04L 12/4633 |
| 2019/0306111 A1* | 10/2019 | Tang | H04L 61/1552 |
| 2019/0306188 A1* | 10/2019 | Medvedovsky | H04L 61/1511 |
| 2019/0334869 A1* | 10/2019 | Grant | H04L 61/3025 |
| 2020/0106790 A1* | 4/2020 | Bagnall | G06F 16/23 |

OTHER PUBLICATIONS

Talha Naqash et al: "Protecting DNS from Cache Poisoning Attack by Using Secure Proxy", Emerging Technologies (ICET), 2012 International Conference on, IEEE, Oct. 8, 2012 (2012-10-08), pp. 1-5.

* cited by examiner

FIG. 2

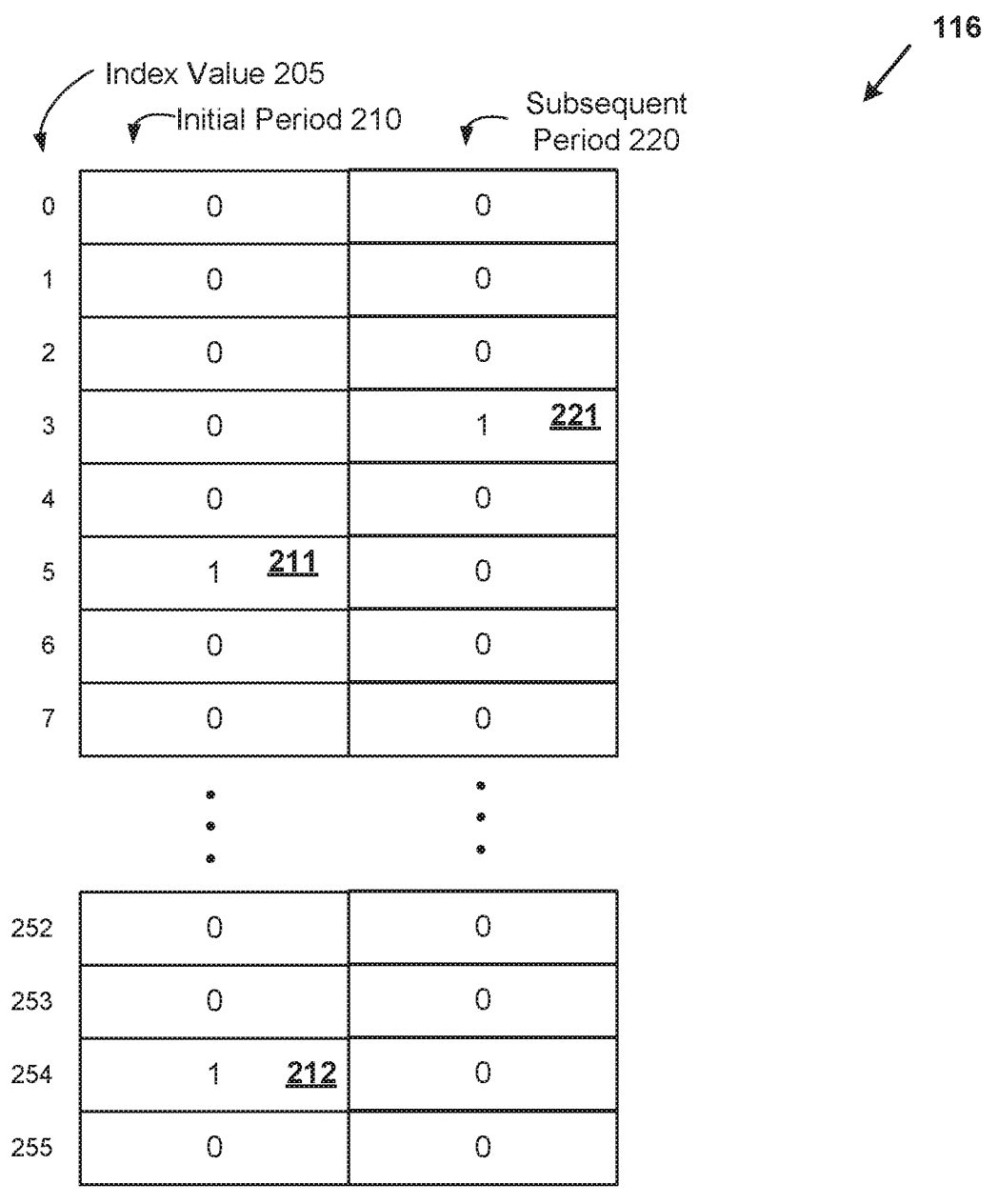

| Index Value 205 | Initial Period 210 | Subsequent Period 220 |
|---|---|---|
| 0 | 0 | 0 |
| 1 | 0 | 0 |
| 2 | 0 | 0 |
| 3 | 0 | 1  221 |
| 4 | 0 | 0 |
| 5 | 1  211 | 0 |
| 6 | 0 | 0 |
| 7 | 0 | 0 |
| ⋮ | ⋮ | ⋮ |
| 252 | 0 | 0 |
| 253 | 0 | 0 |
| 254 | 1  212 | 0 |
| 255 | 0 | 0 |

116

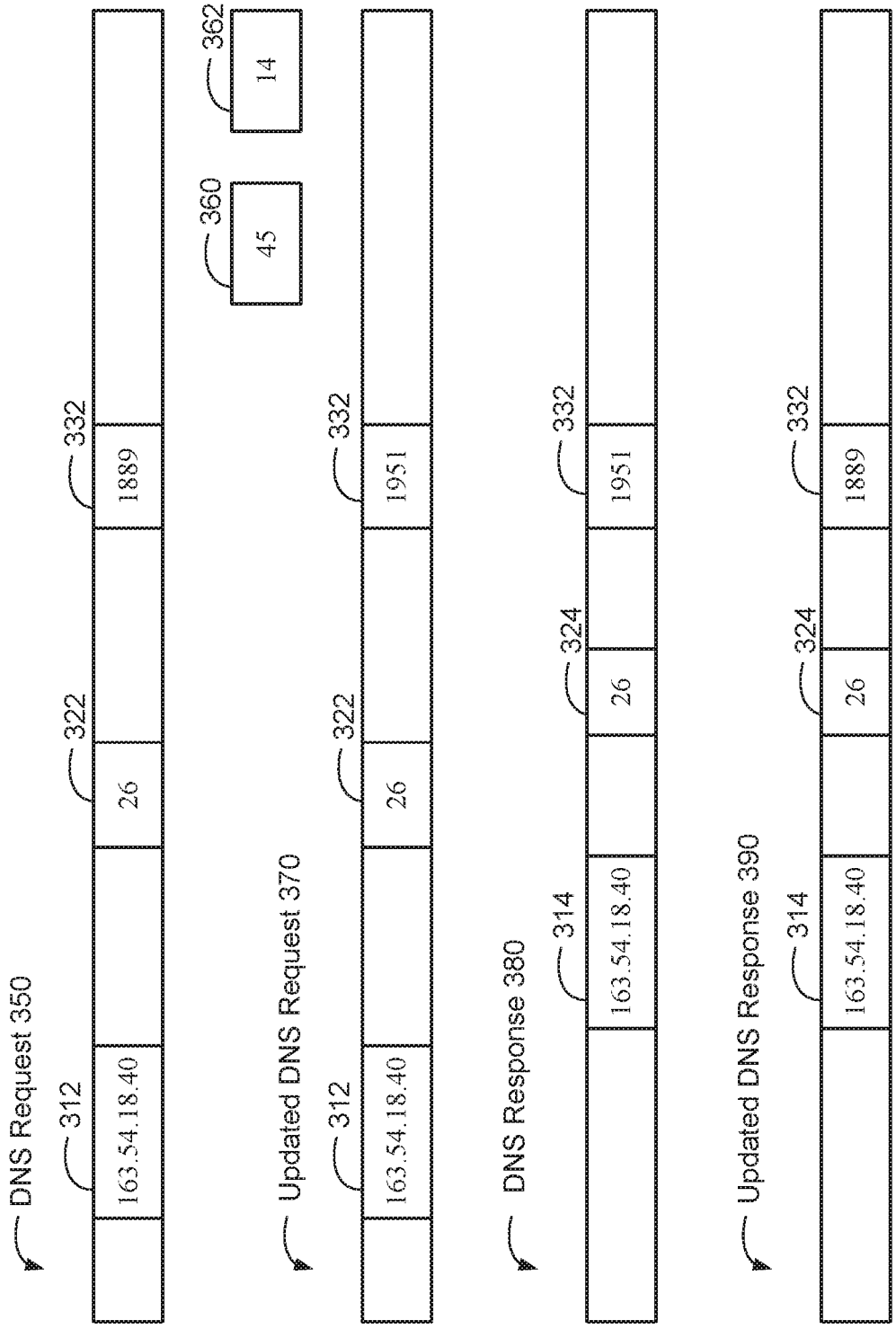

PROCESSING PACKETS WITH RETURNABLE VALUES

FIELD

This technology generally relates to network traffic management, and more specifically to processing packets with returnable values, such as Domain Name System (DNS) packets.

BACKGROUND

A software application can be distributed or partitioned across different computing devices. For example, a client-server architecture can partition tasks between a client device (such as a laptop or mobile device) and one or more application server computers connected by an interconnection network (such as the Internet) and managed by a provider of computing service(s) and/or computing resource(s). The application server computer(s) can execute software applications to provide virtual resources, software services, and/or content to the client devices. For example, client devices can initiate communication sessions with the application server computers by sending requests over the interconnection network to the application server computers, and the servers can respond to the requests. Additionally or alternatively, the application server computers can push information (without an initiating request) to the client devices over the interconnection network. As the number of client devices seeking access to the application server computers increases, intermediary computing devices, such as network traffic management computing device(s), can be added between the client devices and the application server computers. Network traffic management computing device(s) can perform security, processing, and/or routing functions of the client-server architecture, such as encrypting and/or decrypting traffic between the client and the application server. For example, the network traffic management computing device can potentially increase the scalability, availability, security, and/or performance of the client-server architecture. However, as the complexity of applications increases and the number of interconnected devices increases, there can be many challenges in implementing a high performance, highly available, and secure client-server architecture including an intermediary computing device.

BRIEF SUMMARY

Generally, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One example includes a method implemented in cooperation with a network traffic management system including one or more network traffic management modules, networking modules, or server modules, the method including: intercepting a Domain Name System (DNS) request including original returnable request values in respective request packet fields. The method also includes updating the respective request packet fields of the DNS request by replacing an original returnable request value with a replacement value. The replacement value is selected so that a hash function using the values of the updated respective request packet fields as an input generates a first hash value. The method also includes forwarding the updated DNS request to a DNS server. The method also includes receiving a DNS response comprising returnable response values in respective response packet fields. The method also includes using the returnable response values as inputs to the hash function to generate a second hash value. The method also includes in response to determining the second hash value matches the first hash value, updating the respective response packet fields of the DNS response, by replacing the returnable response value of at least one of the respective response packet fields with the original returnable request value, to generate an updated DNS response. The method also includes forwarding the updated DNS response to the client.

Other embodiments incorporating this example include corresponding computer systems, apparatus, and computer programs recorded on one or more non-transitory computer readable media (e.g., computer storage devices), each configured to perform the actions of the methods. An example computer system includes one or more network traffic management modules, networking modules, or server modules, memory comprising programmed instructions stored thereon, and one or more processors configured to be capable of executing the stored programmed instructions to perform the actions of the methods. An example non-transitory computer readable medium having stored thereon instructions for processing network packets with returnable values, the instructions comprising executable code that, when executed by one or more processors, causes the processors to perform the actions of the methods. An example network traffic management apparatus includes memory comprising programmed instructions stored thereon and one or more processors configured to be capable of executing the stored programmed instructions to perform the actions of the methods.

BRIEF DESCRIPTION OF THE DRAWINGS

FIG. 2 is a block diagram of an example data structure for packet processing logic.

FIG. 3B is a block diagram of example packets having returnable values at different points in a DNS flow.

DETAILED DESCRIPTION

Overview

Figure 1:
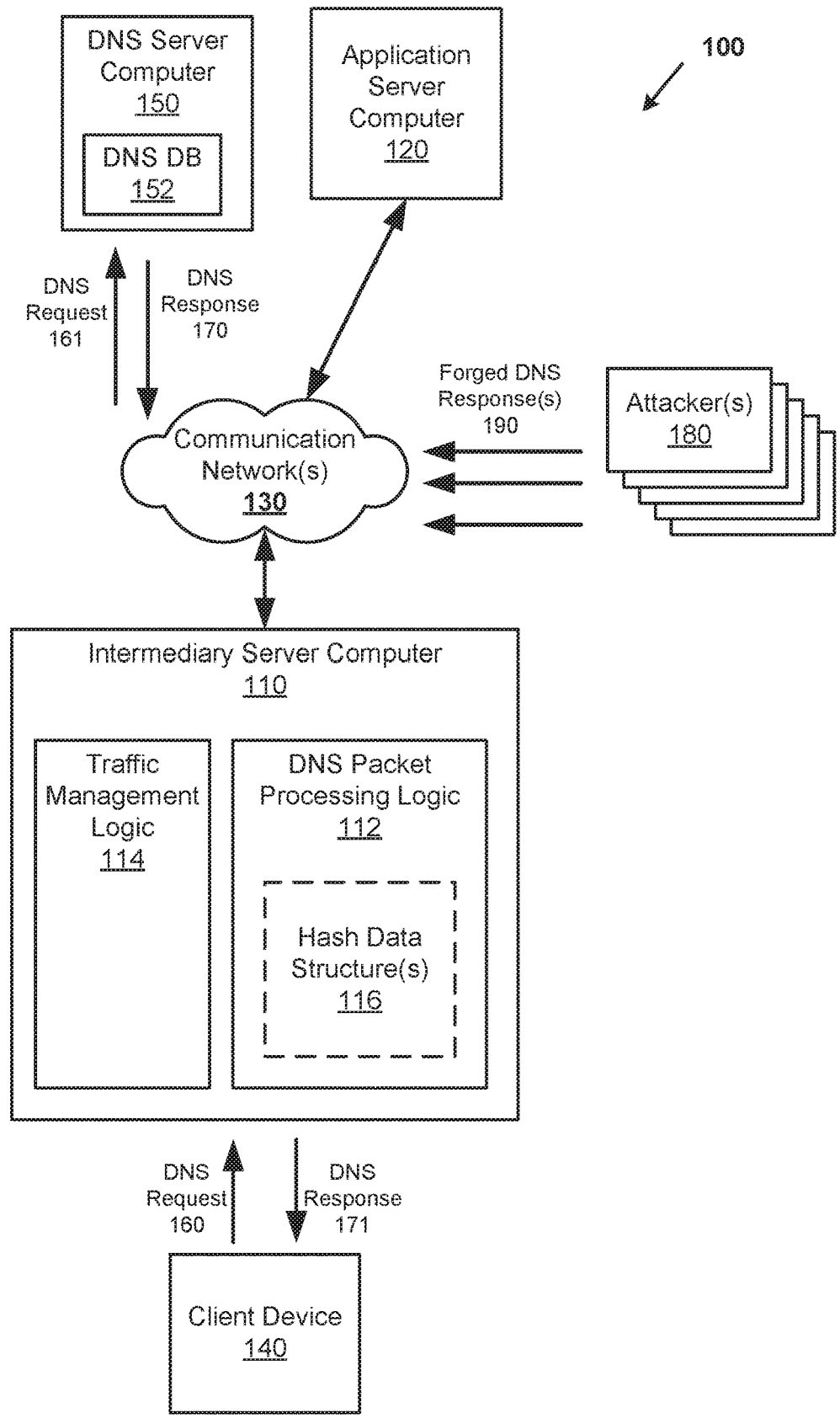
FIG. 1 is a block diagram of an example client-server architecture including an intermediary server computer including packet processing logic, such as for Domain Name System (DNS) packets.

An intermediary server computer can perform various proxy and other services by processing packets that transit the intermediary server computer. For example, the intermediary server computer can perform load balancing, rate monitoring, caching, encryption/decryption, session management (including key generation), address translation, denial-of-service (DoS) protection, and/or access control, for example. An intermediary server computer can act as a proxy for an application server. A proxy is an agent that is situated in a path of communication between a client and a server (e.g., an application server) that can intercept communications (e.g., network packets, frames, datagrams, and messages) between the client and the server. Load balancing can include distributing or disaggregating workloads from many clients across different server computers. Additionally, functions performed by the application server computer can be offloaded from the application server computer to the intermediary server computer.

The Domain Name System (DNS) protocol can be used to map a website name (e.g. website.com) to a network address of a website server (e.g. 165.160.13.20) that hosts the website. As one example, a DNS client can send a DNS request, requesting an address of a website, to a DNS server, which can respond with both the name of the website and the address of the website. The client can match the DNS response to the DNS request by comparing the name of the website in the response to the names of websites that were requested. An intermediary server computer can potentially speed up DNS by caching DNS responses and using the cached values to respond directly to the DNS clients rather than waiting for a DNS request to be transmitted to and from the DNS server. Specifically, the caching of the DNS information can be performed by a DNS recursive resolver of the intermediary server computer, where the DNS recursive resolver can issue DNS service requests (DNS queries) on behalf of DNS clients and cache the responses.

One way that an attacker can block a client from using an application server is by blocking the client from receiving valid DNS responses and/or by corrupting stored DNS information that provides an address for the application server. Two types of DNS response-based attacks are DNS reflection/amplification attacks and DNS cache poisoning attacks. A DNS reflection attack can be launched against a DNS recursive resolver when an attacker sends DNS requests to internet authoritative DNS servers with the victim's source network address (e.g., Internet Protocol (IP) address) spoofed, causing the (possibly much larger) DNS responses to be sent to the victim where they ultimately must be inspected and dropped. A DNS cache-poisoning attack is similar, but may be direct instead of reflected from the DNS server. In the cache-poisoning attack, the attacker crafts illegitimate DNS responses and sends them to a victim, randomizing port numbers and query ID numbers in an attempt to trick a DNS resolver into accepting a forged response (and caching it for a forged time-to-live (TTL)) before the true response from an actual query made by the resolver arrives from the authoritative DNS server originally contacted. While the intermediate goals of the attacks are somewhat different, they both involve receiving a flood of DNS responses that ultimately will be inspected before being dropped. In this way, the DNS attacks are similar and can potentially be addressed with similar techniques.

One solution for DNS resolver software to distinguish between "garbage" responses and valid DNS responses is to match an arriving response to a pending outstanding query by inspection of each response. For example, the match can be performed by first performing an L3/L4 flow match and then checking to determine if the response's query identifier (ID) matches the request's query ID. Additional checks can be performed to confirm that other query fields (such as a query domain name) in the response match the query fields in the request. However, these checks can be computationally expensive which can potentially reduce DNS and other network traffic processing speeds and/or cause additional computational resources to be allocated to the matching.

As described herein, the legitimate DNS responses can be separated from the illegitimate DNS responses using techniques that may be more efficient than directly matching the query fields of DNS responses and requests, thereby increasing throughput and/or conserving system resources for use on legitimate traffic. Specifically, the illegitimate DNS responses can be efficiently pruned from the legitimate DNS responses by using returnable properties of the request/response packets to create an efficient filter to block the illegitimate DNS responses. A returnable property is a property of a packet that is returned unchanged in response to a request. Specifically, returnable request values are values of a request that are defined by a communications protocol to be returned unmodified in a response to the request. Returnable response values are values of a response that are defined by a communications protocol to match values in a request that generated the response. A returnable request value will have a matching returnable response value, which can be returned in the same or a different packet field than the returnable request value. For example, a source network address (e.g., a source IP address) from a request will be returned unmodified in a response to the request as the destination network address. As another example, a source transport layer port (e.g., a UDP or TCP source port) from a request will be returned unmodified in a response to the request as the destination port.

Returnable values of a DNS request packet can include a Query ID, a case of each letter of the query name, an L4 source port, and to some extent, an L3 source address. When forming a DNS request to issue to a DNS authoritative server, a client (or an intermediary server computer on behalf of the client) can modify the returnable values in a deterministic way to make the legitimate DNS responses relatively easy (e.g., less computationally expensive) to distinguish from the illegitimate DNS responses. The returnable values can be modified because some changes to the returnable values will not affect the substantive data (e.g., the address of the requested website) in the DNS response. As one example, the DNS server is architected to look up a domain name in a case-insensitive manner (e.g., a query for Web Site.Com, WEBSITE.COM, and website.com will return the same address). Thus, a query for a particular element of DNS information can be formed in many different ways.

In one example, returnable elements of a DNS query can be perturbed in a purposeful manner, so that illegitimate DNS responses can be quickly and efficiently detected by software and/or purpose-built hardware. The detection can occur with no or a small amount of state held for each query issued. For example, returnable elements of a DNS query can be perturbed so that a hash value of the perturbed returnable elements match a constant or a small group of constants. The hash value can be generated from a hash function that uses the returnable elements as an input. A nonce that changes over time can also be an input to the hash function to generate the hash value. As a specific example, a hash of the DNS query can include hashing the request's local (source) address, local (source) port, query ID, case perturbations of the query name, and a periodically changing nonce. For each DNS response packet that is returned, a hash of the response can include hashing the response's local (destination) address, local (destination) port, query ID, case perturbations of the query name, and the current or past nonces. When the hash of the response matches the constant or the small group of constants for the perturbed requests, then the response is fairly likely to be a legitimate response. Forged responses are less likely to pass the response validation checks (e.g., hash to the constant or small group of constants) and can be dropped before performing a more complete matching to the pending requests, saving CPU cycles and memory bandwidth. The nonce can be periodically changed to make it more difficult for an attacker to reverse the method of transformation which can help mitigate replay attacks.

As another example, the returnable elements of a DNS query can be used to generate an identifier for the returning matching DNS response. For example, the identifier can be generated by hashing the request's local (source) address, local (source) port, query ID, and/or case of the query name. The identifier can be used to mark an entry in a Bloom filter, indicating that a request having the identifier has been issued to a DNS server. For incoming DNS responses, the corresponding returnable values (e.g., the response's local (destination) address, local (destination) port, query ID, and/or case of the query name) can be hashed, and the hash value can be used to index into the Bloom filter. If the indexed entry of the Bloom filter is marked, then the DNS response is likely to be legitimate, but if the indexed entry of the Bloom filter is not marked, then the DNS response is not legitimate. The Bloom filter can be changed periodically (e.g., every five seconds) so that the entries do not become stale, and a DNS response can be checked against the different Bloom filters to account for transit and processing times for the DNS request/responses. By increasing a size of the Bloom filter, the probability of filtering out illegitimate responses can be increased, but the storage resources to store the Bloom filter will be increased.

As another example, a method can include intercepting a DNS request including returnable request values in respective request packet fields. A hash function can be used to characterize or modify the intercepted returnable request values. The intercepted DNS request can be forwarded to a DNS server. A DNS response including returnable response values in respective response packet fields can be received. The returnable response values and the hash function can be used to determine whether the DNS response is legitimate. A legitimate DNS response can be forwarded to a client.

Example Architectures for Processing Packets with Returnable Values

FIG. 1 is a block diagram of an example client-server architecture 100 including an intermediary server computer 110 including Domain Name System (DNS) packet processing logic 112. Specifically, FIG. 1 illustrates how network traffic between a client device 140 and an application server computer 120 and/or a DNS server computer 150 can be forwarded by the intermediary server computer 110 and how DNS packets can be processed by the intermediary server computer 110 using the DNS packet processing logic 112. The client-server architecture 100 can include the intermediary server computer 110, the application server 120, communication network(s) 130, the client device 140, and the DNS server computer 150. The client-server architecture 100 can be implemented using a client-server architecture as described in more detail with reference to FIG. 7, where the different components (110, 120, 130, 140, 150) of the client-server architecture can be implemented using a computing environment as described in more detail with reference to FIG. 8.

The client device 140 and the application server 120 can communicate via the communication network(s) 130 and the intermediary server computer 110. Specifically, requests from the client device 140 can be forwarded through the intermediary server computer 110 to the application server 120 using the communication network(s) 130. The client device 140 can be connected to the intermediary server computer 110 using a public and/or private network, such as the communication network(s) 130. As one example, the intermediary server computer 110 can act as a gateway for the client device 140 to reach public networks, such as the Internet. For example, the intermediary server computer 110 can be managed by an Internet service provider or other provider that connects clients (e.g., the client device 140) to public networks. The client device 140 can send requests to the application server 120 using addresses provided by the DNS server computer 150. As described in more detail below, the client device 140 can send requests (e.g., DNS request 160) to the DNS server computer 150 via the intermediary server computer 110, and DNS responses (e.g., DNS response 171) can be returned to the client device 140.

The client device 140 can be a computing device capable of sending network traffic over a communications network (e.g., network 130). For example, the client device 140 can be a mobile computing device, a desktop computing device, a laptop computing device, a tablet computing device, a virtual machine executing on a cloud-based computing environment, and so forth. The client device 140 can execute an agent (e.g., a browser or other software application) that requests a service provided by the application server 120. The agent can make sub-requests to other services (such as requests to the DNS server computer 150) that may be transparent to a user of the client device 140. For example, the agent can generate requests that are transmitted by the client device 140 using a connectionless communication protocol (e.g., user datagram protocol (UDP)) or a connection-oriented communication protocol (e.g., transmission control protocol (TCP)). Each of the server computers of the application server 120 and the DNS server 150 can be computing devices capable of sending network traffic over a communications network (e.g., network 130) and processing requests by client devices (such as the client device 140). The server computers 120 and 150 can include multiple hardware and/or software server resources (not shown), a virtual machine executing on a cloud-based computing environment, and so forth. The application server 120 can execute a server software application, such as an HTTP server application or a secure shell (SSH) server application, for example. The DNS server computer 150 can execute a DNS server software application which can respond to DNS client requests and retrieve information from a DNS database 152.

The traffic management logic 114 of the intermediary server computer 110 can perform various proxy and other services, such as load balancing, rate monitoring, caching, denial of service protection, encryption/decryption, session management (including key generation), address translation, and/or access control, for example. For example, the intermediary server computer 110 can act as a proxy for the application server 120. A proxy is an agent that is situated in a path of communication between a client (e.g., the client device 140) and a server (e.g., the application server 120 and the DNS server 150) that can intercept communications (e.g., network packets, frames, datagrams, and messages)

between the client and the server. The intermediary server computer 110 can function as a virtual server that presents a network address of the proxy as the network address for the server 120 and/or for one or more clients 140.

The traffic management logic 114 can offload DNS packet processing operations by sending DNS packets to the DNS packet processing logic 112. The DNS packet processing logic 112 can include computer hardware, software, or a combination thereof. As one example, the DNS packet processing logic 112 can include a hardware co-processor that is tuned for performing operations of DNS packet processing as disclosed herein. For example, the co-processor can include computer hardware circuitry that is configured to parse DNS packets, generate hash values, search hash data functions, assemble DNS packets, and so forth. The computer hardware can include circuitry that is fabricated for a single purpose and/or configurable circuitry that is programmable, such as a field-programmable gate array (FPGA). As one example, the DNS packet processing logic 112 can include a multi-threaded real-time software routine that interfaces to the traffic management logic 114. For example, the DNS packet processing logic 112 can be a software daemon executed by a processor of the intermediary server computer 110. A daemon is a software routine that runs as a background process. A real-time software routine is a routine that processes information with a time constraint. Real-time systems can schedule tasks (e.g., threads) based on time constraints and can preempt or interrupt tasks based on a priority of completing the task. Each thread of the DNS packet processing logic 112 can communicate with the traffic management logic 114 using a different session.

The DNS packet processing logic 112 can process DNS requests and responses and determine whether to forward DNS requests to the DNS server 150 and whether to forward DNS responses to the client 140. For example, the DNS packet processing logic 112 can cache earlier DNS responses, and can use the cached results to reply to a DNS request from the client 140 without sending an additional request to the DNS server 150. Specifically, the client 140 can send a DNS request 160 to the intermediary server computer 110, the DNS packet processing logic 112 can determine that the information requested in the DNS request 160 is cached, and the DNS packet processing logic 112 can generate a response (e.g., DNS response 171) including the requested information, and send the response back to the client 140.

As another example, the DNS packet processing logic 112 can forward DNS requests from the client 140 to the DNS server 150, such as when the requested DNS information is not locally cached at the intermediary server computer 110. The forwarded DNS requests can be modified or unmodified. For example, the DNS packet processing logic 112 can modify one or more returnable values of a DNS request, so that the returnable values in the matching DNS response can be used to efficiently identify legitimate DNS responses. Specifically, the client device 140 can address a DNS request 160 to the DNS server computer 150. The intermediary server computer 110 can intercept the DNS request 160 and the request 160 can be processed by the DNS packet processing logic 112. The request 160 can be parsed to identify returnable values in respective packet fields of the request 160. For example, the fields for the source network address, the source port, the DNS query identifier, and the case and/or value of the domain name requested can include returnable values. The original returnable values of the request 160 can be stored by the DNS packet processing logic 112. The original returnable values of the request 160 can be updated by replacing at least one of the original returnable values with a replacement value, where the replacement value can be selected so that a hash function using the values of the updated respective packet fields as an input generates a constant value. As a specific example, the case of a requested domain name can be changed (e.g., from website.com to WeBsIte.COM) so that a hash function, using the updated returnable values as inputs, produces a particular hash value (e.g., 42). An updated DNS request 161, having the updated returnable values, can be forwarded from the intermediary server computer 110 to the DNS server 150. The DNS server 150 can look up the requested DNS information using the DNS database 152 and can generate a DNS response packet 170 addressed back to the client device 140. The DNS response packet 170 can include the updated returnable values as well as the requested DNS information. The intermediary server computer 110 can intercept the DNS response packet 170 on behalf of the client device 140. The DNS packet processing logic 112 can use the updated returnable values of the DNS response packet 170 as inputs to the hash function to generate a hash value that will match the hash value generated using the updated returnable values of the DNS request 161. When the hash values match, it is likely that the DNS response 170 is a legitimate response and so additional (more computationally expensive) comparisons can be completed to match the DNS response packet 170 to the updated DNS request 161. When there is a match, the updated returnable values can be changed back to the original returnable values in the DNS response 171 and sent to the client device 140. In comparison, the forged DNS responses 190 sent by the attackers 180 are likely to be generated without knowledge of the hash value checking performed by the DNS packet processing logic 112. Thus, it is unlikely that that a forged DNS response 190 will have a hash value that matches the hash value for legitimate DNS responses 171. When one of the forged DNS responses 190 does have a matching hash value, a more complete comparison (e.g., matching the individual packet fields) can be used to discard the forged DNS response 190. By discarding many or most of the forged DNS responses 190 after a comparison of the hash value, computational resources of the intermediary server computer 110 can be conserved for legitimate network traffic.

As another example, the DNS packet processing logic 112 can use a hash value of the returnable values of DNS requests to filter legitimate DNS responses from forged DNS responses. Specifically, the intermediary server computer 110 can intercept the DNS request 160 that is sent from the client 140 and addressed to the DNS server 150. The DNS packet processing logic 112 can use the returnable values of the DNS request 160 to generate a hash value that can be used as an index into a hash data structure 116, such as a Bloom filter. The hash value generated by the returnable values of the DNS request 160 can be marked in the hash data structure 116 to indicate that the DNS request 160 was received. The returnable values of the DNS request 160 can be sent unmodified in a DNS request 161 to the DNS server 150. The DNS server 150 can respond to the DNS request 161 with a DNS response 170 that has returnable values that match the returnable values of the DNS request 161. The intermediary server computer 110 can intercept the DNS response 170 and generate a hash value using the returnable values of the DNS response 170. The hash value generated from the DNS response 170 can be used as an index into the hash data structure 116 to determine that the DNS response 170 was sent in response to the DNS request 161 (because the packets 170 and 161 have matching hash values when the returnable values are used as inputs to the hash function). When the hash data structure 116 indicates that the DNS response 170 is legitimate, additional checking of the packet fields can be performed and/or the DNS response can be forwarded to the client 140. In comparison, it is unlikely that that using the returnable values of a forged DNS response 190 will have a hash value that matches the hash value for legitimate DNS responses 171. Using a hash function with a larger number of possible hash values can decrease the likelihood that a forged DNS response 190 will have a matching hash value to the DNS request 160, but may increase a size of the hash data structure 116.

FIG. 2 is a block diagram of an example hash data structure 116 that can be used by the DNS packet processing logic 112. A data structure is an organization for data that is stored in a computer-readable memory and that can be accessed by computer logic (e.g., software, hardware, and/or combinations thereof) during execution of the computer logic.

The hash data structure 116 can be organized as table including one or more one-dimensional arrays, where a (row, column) pair of the table is referred to as an entry and the different columns of the table can be written to at different periods of time. For example, the first column 210 can be written to during an initial period of time and the second column 220 can be written to during a subsequent period of time. Initially, the entries of the table can be reset to all zeroes. The entries can be identified using the index values 205 which are labeled 0-255 to represent the $2^8$ values that can be generated by a hash function that can generate an 8-bit value. The returnable values of a DNS request can be used as inputs to the hash function to generate a hash value for the DNS request. During the initial time period (e.g., for five seconds), an entry in column 210 and corresponding to the generated hash value can be set to one to indicate that the DNS request was received. As a specific example, a first DNS request can be received during the initial period and the returnable values can be hashed to a value of 5 so an entry 211 can be marked with a 1 to indicate the DNS request was received. A second DNS request can be received during the initial period and the returnable values can be hashed to a value of 254 so an entry 212 can be marked with a 1 to indicate the second DNS request was received. The initial time period can expire and a subsequent time period can begin. A third DNS request can be received during the subsequent period and the returnable values can be hashed to a value of 3 so an entry 221 can be marked with a 1 to indicate the third DNS request was received. DNS responses can arrive during the time period when the matching DNS request was sent or in a subsequent time period. When a DNS response is received, the returnable values of the DNS response can be hashed to determine a hash value. If the hash value does not match a marked entry (e.g., an entry that was written with a one, such as entries 211, 212, and 221), then the DNS response can be discarded as an illegitimate or forged DNS response. However, if the hash value generated from the returnable values of the DNS response matches a marked entry from the present or a previous time period, the DNS response can be forwarded to the client and/or the packet fields can be checked more completely before forwarding to the client.

It should be appreciated by one of ordinary skill in the art having the benefit of the present disclosure, that while the data structure 116 is illustrated as having two columns and 256 rows, different organizations are possible. For example, adding more columns can enable shorter and/or more time periods to be used and adding more entries can enable a larger range of hash values to be used.

Figure 3A:
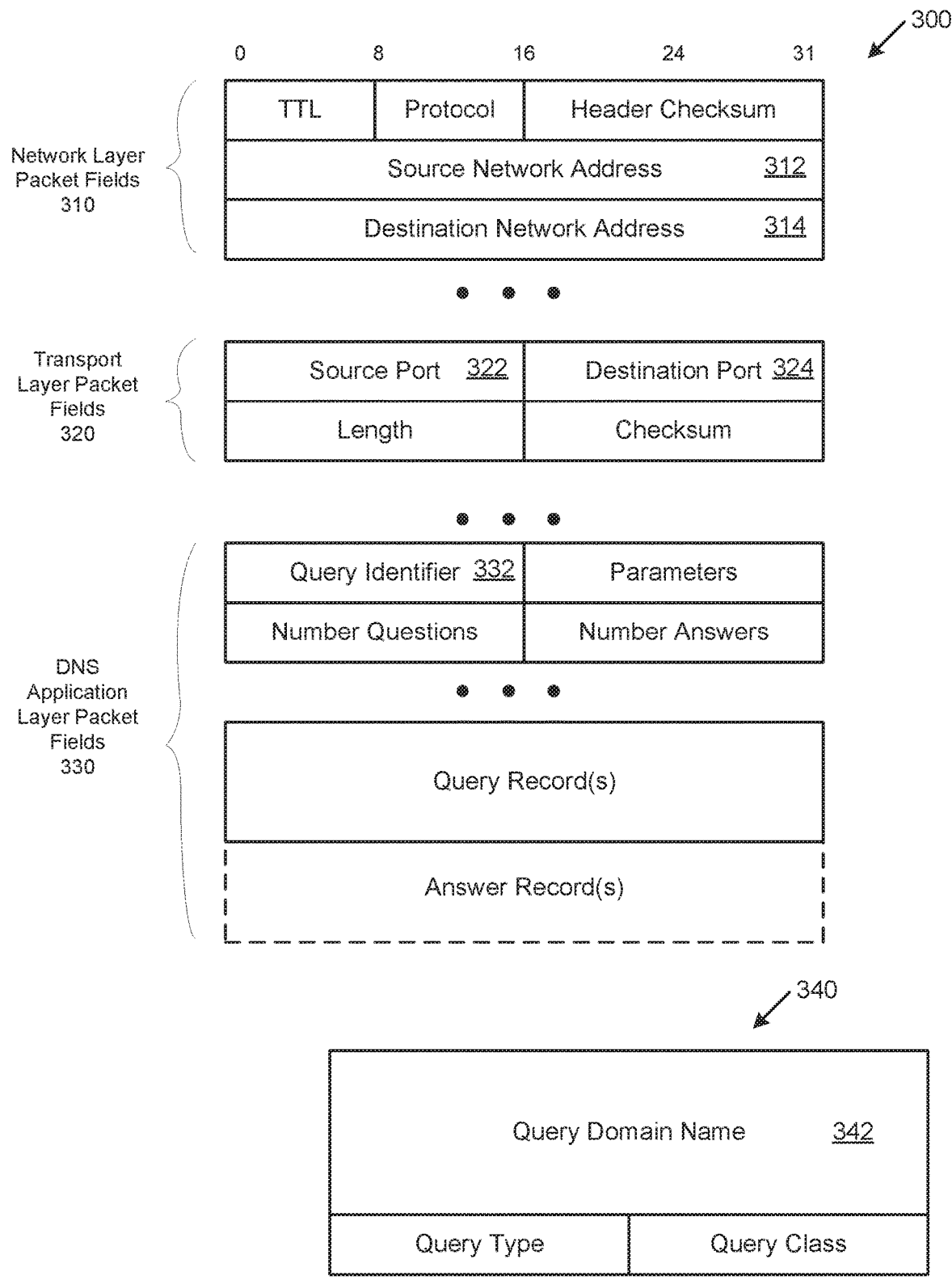
FIG. 3A is a block diagram of an example packet that can store returnable values in respective packet fields.

FIG. 3A is a block diagram of an example packet 300 that can store returnable values in respective packet fields. Specifically, the packet 300 illustrates packet fields of three different layers (network layer packet fields 310, transport layer packet fields 320, and DNS application layer packet fields 330) of a DNS packet. The packet 300 can be used as either a DNS request packet or a DNS response packet, depending on the values that are used in the respective packet fields. FIG. 3B illustrates how the returnable values can be transmitted via different packets during a DNS flow.

The layers within a network packet can be described using the Open Systems Interconnection (OSI) model. The OSI model is one example of how functions of a communication system can be partitioned into abstraction layers. In particular, the OSI model partitions a communication system into seven layers. A particular layer provides a communication path with the layers adjacent (e.g., a layer above and a layer below) to the particular layer. The lowest layer is the physical layer (also referred to as layer 1 or L1) which defines the electrical and physical specifications for communication over a physical transmission medium. Specifically, the physical layer can define voltage levels, signal timing, transmission media (e.g., electrical cables, fiber-optic cables, radio frequencies), and so forth. The physical layer can provide a communication path with the data link layer or link layer (also referred to as layer 2 or L2). The link layer defines the protocols for transferring data between two nodes. Additionally, the link layer can define protocols for establishing and terminating connections between nodes, managing flow control, and detecting and/or correcting errors occurring on the physical layer. Ethernet is an example of a link layer protocol. The link layer can provide a communication path with the network layer (also referred to as layer 3 or L3). An example network layer protocol is Internet Protocol (IP) (including IPv4 and IPv6). Other layers of the OSI model include the transport layer (also referred to as layer 4 or L4), the session layer (also referred to as layer 5 or L5), the presentation layer (also referred to as layer 6 or L6), and the application layer (also referred to as layer 7 or L7). It should be noted that a network packet (or simply a packet) generally includes a header used to address the packet to another entity (e.g., another service, a remote node, or another agent) at the layer of the packet and a payload having a discrete quantity of information. A packet addressing an agent at one layer can be encapsulated within a payload of a packet at a lower layer as the original packet transits the communication layers. A packet of the link layer can also be referred to as a frame. A packet of the transport layer can also be referred to as a datagram. The OSI model is a reference and some networking protocols may not strictly adhere to the seven layers of the OSI model. For example, in some embodiments, the functions of the link layer and the physical layer may be blended into a single link layer. The combination of protocols used at the different layers of the OSI model can be referred to as a protocol stack. For example, one particular protocol stack may include an IP layer and an Ethernet layer.

Turning to FIG. 3A, the network layer packet fields 310 can include a time-to-live field, a protocol field, a header checksum field, a source network address field 312, and a destination network address field 314. The network layer packet fields 310 can provide information for sending a packet from one node (e.g., a client) on a network to another node (e.g., a server) on the network and to provide information about the data payload of the packet. Specifically, the source network address field 312 contains a value that represents the address of source of the network packet and the destination network address field 314 contains a value that represents the address of destination of the network packet. For a DNS request, the source of the request is the DNS client and the destination of the request is the DNS server. For a DNS response, the source of the request is the DNS server and the destination of the request is the DNS client. The protocol field can be used to define the protocol of the data payload of the packet 300. DNS packets can be sent using the UDP transport layer protocol so the value (e.g., 17) contained in the protocol field can represent that the payload of the network packet is a UDP datagram.

The transport layer packet fields 320 can include a source port field 322, a destination port field 324, a length and a checksum. A port number can be used to identify a network service. For example, a request having a value of 53 in the destination port field 324 can be used to identify a request for the DNS service. The value of the source port field 322 can be used to match responses to requests; specifically, a response to a request will have the same value in the destination port field 324 of the response that was used for the source port field 322 of the request.

The DNS application layer packet fields 330 contain information about DNS messages (e.g., requests and responses). The DNS application layer packet fields 330 can include a query identifier field 332 (also referred to as a query ID or a DNS query ID), a parameters field, a number of questions field, a number of answers field, a query records field 334, and an optional answer records field. The query identifier field 332 can be used to identify a specific DNS request and its matching response; specifically, the DNS request and its matching response will use the same value in the query identifier field 332. The parameters field can be used to distinguish between a DNS request packet and a DNS response packet. The query records can include one or more records, such as the example record 340, that specify questions to be answered by the DNS server. The query record 340 can include a query domain name field 342, a query type field, and a query class field. For example, the query record 340 can request the network address of a domain name that is contained in the query domain name field 342. The DNS client provides one or more query records in a request to the DNS server, and the DNS server responds with a response including the one or more query records and one or more answer records that are responsive to the DNS request. The DNS server is architected to return the query records (e.g., the query record 340) in the response exactly as the records were received, so the values of the query record 340 are returnable values.

Returnable values are values that match in a request and its corresponding response. Specifically, returnable request values are values of a request that are defined by a communications protocol to be returned unmodified in a response to the request. In a DNS request packet formatted like packet 300, the returnable request values can include values stored in the source network address field 312, the source port field 322, the query identifier field 332, and the query domain name field 342. Returnable response values are values of a response that are defined by a communications protocol to match values in a request that generated the response. In a DNS request packet formatted like packet 300, the returnable response values can include values stored in the destination network address field 314, the destination port field 324, the query identifier field 332, and the query domain name field 342. A returnable request value will have a matching returnable response value, which can be returned in the same or a different packet field than the returnable request value. For example, a source network address contained in the source network address field 312 of a request will be returned unmodified in the destination network address field 314 of a response to the request. As another example, a source transport layer port stored in the source port field 322 of a request will be returned unmodified in the destination port field 324 of a response to the request. The query identifier field 332 will contain the same value for a request and a response to the request. The query domain name field 342 for a given record will contain the same value for a request and a response to the request.

One or more of the returnable values of an intercepted DNS request from a DNS client can be modified by an intermediary server computer, and the modified request can be sent to the DNS server. The DNS server will respond with returnable values that match the returnable values in the modified request. The intermediary server computer can replace the modified returnable values with the original returnable values in the response back to the DNS client. The intermediary server computer can modify the returnable values of a response because the intermediary server computer may have more flexibility than a DNS client. For example, the intermediary server computer may support a range of network addresses (such as the range of addresses for an enterprise or a range of client addresses for an ISP) and so it can modify the source network address of outgoing DNS requests within the range of network addresses that will be received by the intermediary server computer. Similarly, the source port, query identifier, and other fields can be modified by the intermediary server computer for outgoing DNS requests.

FIG. 3B illustrates a specific example of how the returnable values can be transmitted via different packets during a DNS flow. The DNS request packet 350 can be sent from a DNS client and intercepted by an intermediary server computer. The DNS request packet 350 includes returnable values in the source network address field 312, the source port field 322, and the query identifier field 332. Specifically, the original values sent from the DNS client include 163.54.16.40 in the source network address field 312, 26 in the source port field 322, and 1889 in the query identifier field 332. When the DNS request packet 350 is received, the nonce value 360 can be 45 and the constant hash value 362 can be 14. The nonce value 360 can be used as an input to a hash function for all DNS request packets and all DNS response packets received during a given time period. In this example, the hash function can be a modular sum of the returnable values and the nonce, with a modulus of 256. A preliminary hash of the DNS request packet 350 yields 208 (40+26+1889+45=2000; 2000 mod 256=208). The DNS request packet 350 can be updated to generate the updated DNS request packet 370. Specifically, one or more original returnable values of the DNS request packet 350 can be replaced with replacement value(s) that are selected so that the hash function generates the constant hash value 362 using the values of the updated respective request packet fields (312, 322, and 332) and the nonce 360 as inputs. In other words, the replacement value(s) are the values that cause the hash function to generate the constant hash value 362 when the returnable values of the updated DNS request packet 370 and the nonce 360 are used as inputs. In this example, a single replacement value can be used in the query identifier field 332. An example replacement value can be calculated as 1951 (1792+(256−208)+14=1951). The original returnable value can be stored for the DNS request packet 350 for later use when a DNS response is returned.

The updated DNS request packet 370 includes the original values in the returnable fields 312 and 322 and the replacement value in the returnable field 332. The updated DNS request packet 370 can be sent to a DNS server. The DNS server can process the request and generate a DNS response. The DNS response will include the returnable values. However, some of the returnable values can be located in different packet fields than in the updated DNS request 370. Specifically, the value in the source network address field 312 of the updated DNS request 370 is moved to the destination network address field 314 of the DNS response packet 380; and the value in the source port field 322 of the updated DNS request 370 is moved to the destination port field 324 of the DNS response packet 380. The returnable value in the query identifier field 332 stays in the same field for both the updated DNS request 370 and the DNS response packet 380. The DNS response packet 380 can be received at the intermediary server computer and the DNS response packet 380 can be hashed using the hash function. The hash of the DNS response packet 380 yields 14 (40+26+1951+ 45=2062; 2062 mod 256=14). The DNS response packet 380 can be categorized as legitimate because the hash value of the packet 380 is equal to the constant hash value 362. In response to determining the DNS response packet 380 hashes to the constant hash value 362, the DNS response packet 380 can be updated with the original returnable value (e.g., 1889) before it is returned to the DNS client. Specifically, the updated DNS response packet 390 can be forwarded to the DNS client.

It should be noted that, for ease of illustration, the respective packets and the packet fields of FIGS. 3A and 3B are not drawn to scale. Additionally, while the query identifier field 332 was selected to contain the replacement value in the updated DNS request packet 370, additional and/or different returnable fields can be selected to contain replacement value(s). A variety of different hash functions can be used as alternatives to the example hash function used in the illustration of FIG. 3B.

Figure 4:
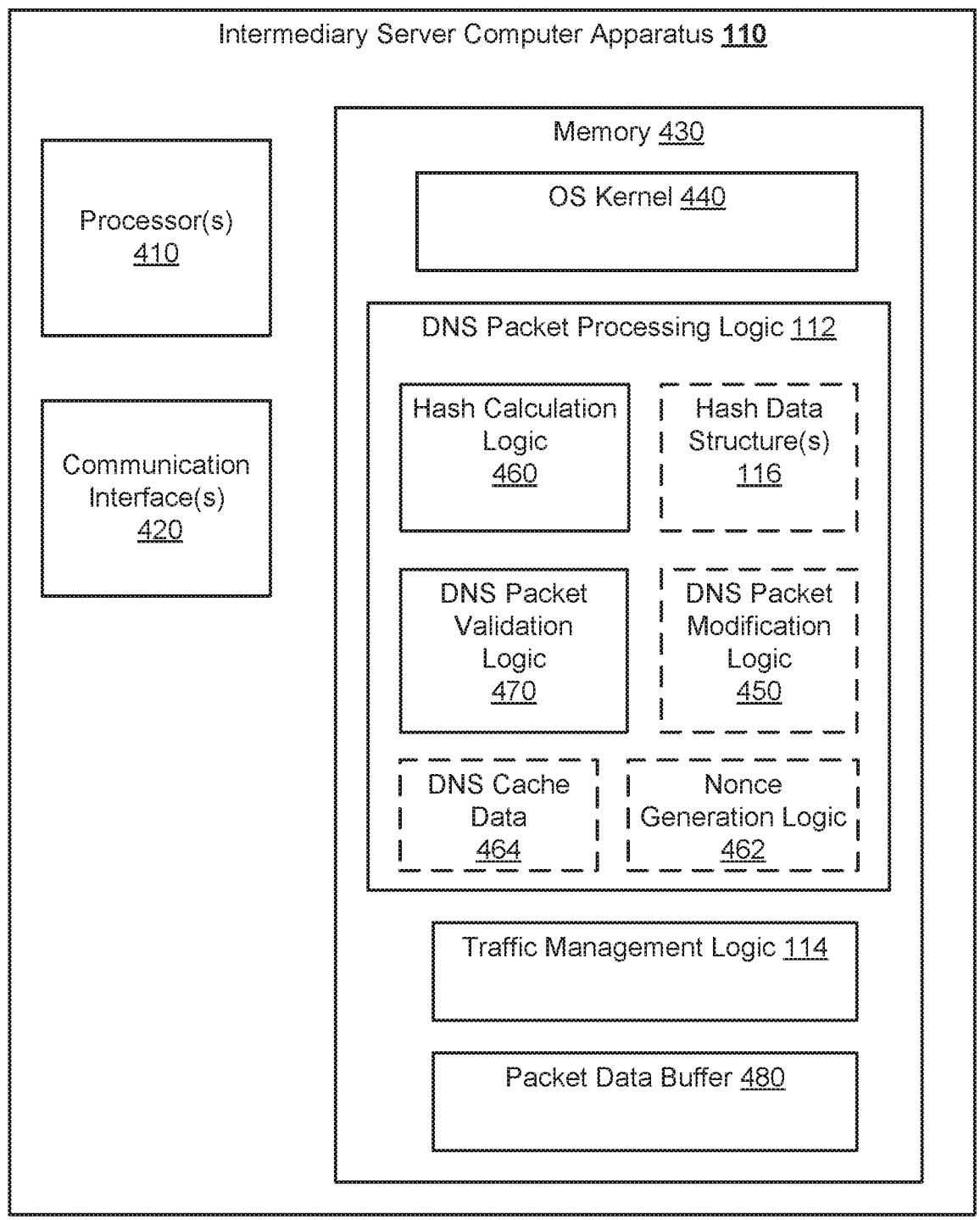
FIG. 4 is a block diagram of an example network traffic management apparatus including packet processing logic.

FIG. 4 is a block diagram of an example intermediary server computer apparatus 110 including DNS packet processing logic 112. For example, the intermediary server computer apparatus 110 can be a load balancer, an application delivery controller, a network traffic management system, or another component configured to be in a communication path between a client (e.g., client 140 of FIG. 1) and an application server (e.g., application server 120 of FIG. 1) of a client-server architecture. The intermediary server computer apparatus 110 can be implemented using a computing environment as described in more detail with reference to FIG. 8.

The intermediary server computer apparatus 110 can include one or more processor(s) 410, one or more communication interface(s) 420, and memory 430. The processor 410, communication interface 420, and the memory 430 can be coupled together with an interconnect (not shown) so that the components of the computer apparatus 110 can communicate with each other using the interconnect. The communication interface 420 can be used to send and receive communications (e.g., network packets) with other computing devices, such as a client, an application server, and a DNS server. The processor 410 can be used to execute computer-executable instructions that are stored in the memory 430 and/or storage resources (not shown). The computer-executable instructions can be organized into software routines (also referred to as modules or components) comprising executable code to perform various computing tasks. It should be noted that while FIG. 4 illustrates one organization of routines, other organizations are possible. For example, the illustrated routines can be sub-divided into smaller routines and/or combined into larger routines. The memory 430 can also include structured and/or unstructured data (e.g., hash data structure(s) 116) that is used by the software routines to perform the computing tasks.

The operating system (OS) kernel 440 can include different software routines for managing different aspects of the execution of programs and for interfacing with the hardware of the intermediary server computer apparatus 110. For example, the OS kernel 440 can manage the loading and removal of software applications and other routines into the memory 430 of the computer apparatus 110; the OS kernel 440 can manage storage resources of the computer apparatus 110; the OS kernel 440 can manage processes and/or threads executing on the processor 410; the OS kernel 440 can manage power states of the computer apparatus 110; the OS kernel 440 can provide an interface for applications and other routines to send and receive communications (e.g., network packets) using the communications interface 420; and the OS kernel 440 can enable inter-process communication between different routines executing on the computer apparatus 110.

The traffic management logic 114 can include different software routines for controlling the network traffic transiting the intermediary server computer 110 by performing various proxy and other services, such as load balancing, rate monitoring, caching, encryption/decryption, TLS session management (including key generation), address translation, traffic forwarding, traffic buffering, and/or access control, for example. For example, the traffic management logic 114 can buffer network traffic (such as in the packet data buffer 480) that is to be processed before the traffic is sent over a private or public network to a client or server. As another example, the traffic management logic 114 can buffer outstanding requests that are awaiting a reply from an application server or a DNS server. The traffic management logic 114 can identify DNS network traffic and can request that the DNS packet processing logic 112 analyze and process the DNS packets. For example, the DNS packet processing logic 112 can service a DNS request using data from the DNS cache 464, when there is a hit in the DNS cache 464. Servicing the DNS request can include generating a DNS response, and causing the DNS response to be sent to the DNS client.

The DNS packet processing logic 112 can be organized in various different ways. As one example, the DNS packet processing logic 112 can include hash calculation logic 460, hash data structures 116, DNS packet modification logic 450, DNS packet validation logic 470, nonce generation logic 462, and a DNS cache 464. The different components of the DNS packet processing logic 112 can be implemented in computer hardware, software, and combinations thereof.

The DNS packet processing logic 112 can analyze DNS requests and forward the requests, modified or unmodified, to a DNS server. As one example, the DNS requests can be modified so that a set of returnable values of the modified DNS requests will hash to a constant value. DNS responses can then be filtered by verifying whether a hash of the returnable values of the responses match the hash of the DNS requests. As another example, the DNS requests can be forwarded unmodified. A set of returnable values of the unmodified DNS requests can be hashed to generate a hash value which can be used as an index to the hash data structure 116. For example, the hash data structure 116 can be a Bloom filter and the index value can be marked to indicate a DNS request with the hash value was forwarded.

In these examples, a hash function can be used to create a hash value using inputs (e.g., values of packet fields) of the DNS requests. A hashing algorithm (also referred to as a hash function) can be used to transform one or more input values to an output value (also referred to as a hash value or a hash) within a range of the hashing algorithm. For example, a hashing algorithm can be used to transform a set of input values into a hash value that falls within a range of numbers (e.g., the number of values in a hash table). For example, a hashing algorithm can add a set of numbers using modular arithmetic. As a specific example, the set of numbers can be added using modular arithmetic with a modulus of 256 so that the hash value is within a range of 0-255.

The DNS packet processing logic 112 can modify DNS requests to make legitimate DNS responses easier to distinguish from illegitimate DNS responses. The DNS packet processing logic 112 can use a set of returnable values of the DNS request as inputs to the hashing algorithm (e.g., the hash calculation logic 460). As one example, the set of returnable values used as an input to the hashing algorithm can include the source network address, the source port, the query identifier, and the query domain name or the case of the query domain name. Additionally, a nonce can also be used as an input to the hashing algorithm. For example, the nonce generation logic 462 can generate different nonces for different periods of time. By adding a nonce as an input to the hashing algorithm, it can be more difficult for an attacker to determine a pattern to the DNS requests and so it can be more difficult for the attacker to generate DNS responses that could defeat DNS attack mitigation logic. When a simple hash, such as modular arithmetic, is used, it can be straightforward to modify one or more of the input values to generate a constant value from the hashing algorithm using the modified input values. For example, a preliminary hash value can be generated using a subset of the returnable values (e.g., the source network address, the source port, the query domain name, and the nonce) and the query identifier can be selected (e.g. modified from the original) so that the output of the hash function is equal to the desired constant. Specifically, the hash (e.g., the modular sum) of the preliminary hash value and the selected query identifier will equal to desired constant. A modified DNS request can include the original source network address, source port, and query domain name, and the modified query identifier. The modified DNS request can be forwarded to a DNS server and the DNS server will return a DNS response with the same modified returnable values. The returnable values in the response can be used as inputs to the hashing algorithm (along with the nonce) to generate the same constant value that was generated for the request. When the hash values for the requests and the response match, the DNS response is likely to be legitimate. Additional checking of the response can be performed to confirm that the unmodified returnable values of the response match the original returnable values of the request. The information from legitimate DNS responses can be added to the data stored in the DNS cache 464. The DNS response from the DNS server having the modified returnable values can be modified so that the DNS response includes the original returnable values before the response is sent to the DNS client. When the hash values for the requests and the response do not match, the DNS response is likely to be illegitimate, and the DNS response can be dropped without further processing.

The DNS packet processing logic 112 can record one or more properties of unmodified DNS requests to make legitimate DNS responses easier to distinguish from illegitimate DNS responses. Specifically, the properties can include a hash value of returnable values of the DNS request. For example, a set of returnable values of the DNS request can be used as inputs to one or more hashing algorithms. The set of returnable values used as inputs to the hashing algorithm can include the source network address, the source port, the query identifier, and the query domain name or the case of the query domain name. The case of the query domain name can be determined by looking at the fifth bit (where the bits of a byte are labelled from 0 to 7), where a 0 in the fifth bit indicates an uppercase character and a 1 in the fifth bit indicates a lowercase character. The hashing algorithm can be simple (as described above) or more complicated. For example, the hashing algorithm can be a cryptographic hash having a one-way property, where it can be computationally infeasible to determine the input value(s) of the hashing algorithm given the hash value generated by the hashing algorithm. The hash value generated by the hashing algorithm can be used as an index into the hash data structure 116. For example, the hash data structure 116 can be a Bloom filter.

A Bloom filter is a probabilistic data structure that can be used to determine whether a value is stored within the Bloom filter. For example, the Bloom filter can use one or more hash functions to map a given value or values (e.g., the returnable values of a DNS packet) to one or more entries of the Bloom filter. The Bloom filter includes an array of bits, where each of the bits represents a value within the range of the hash function(s). An empty Bloom filter containing no values can have all bits in the array cleared or equal to zero. To add a DNS request to the Bloom filter, the returnable values of the DNS request are used as inputs to each of the hash functions to produce a respective output value corresponding to a bit within the array of bits, which is set or equal to one when the DNS request is added to the Bloom filter. As a specific example, if two hash functions of a Bloom filter generate hash values in the range of 0-1023, and a new DNS request to be added to the Bloom filter produces hash values of 17 and 98, then bits 17 and 98 of the bit array can be set (e.g., made a value of one) to indicate that the new DNS request has been added to the Bloom filter. To determine whether a test value (e.g., a DNS response) has been added to a Bloom filter, the returnable values of the DNS response can be used as inputs to the different hash functions to produce different output values corresponding to bits within the array bits. If all of the corresponding bits are set, the test value has been previously stored in the Bloom filter, and the DNS response is likely to be legitimate. However, if any of the corresponding bits are not set, the test value has not been previously stored in the Bloom filter, and the DNS response is likely to be illegitimate. Illegitimate DNS responses can be dropped and legitimate DNS responses can be forwarded to a DNS client. Using a Bloom filter can potentially reduce an amount of computing resources that are used to determine whether a value has been learned.

Example Methods of Processing Packets with Returnable Values

Figure 5:
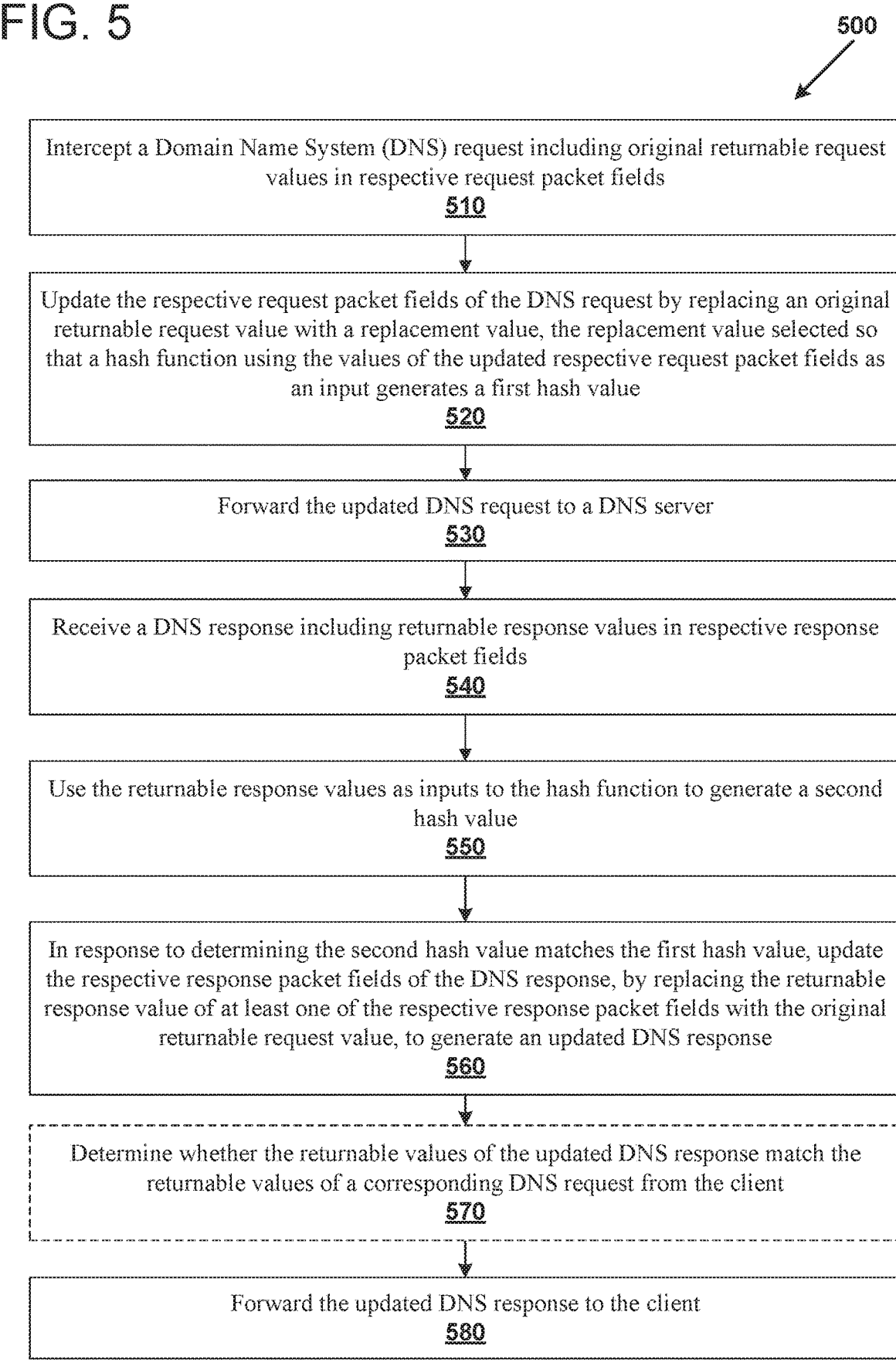
FIG. 5 is a flowchart of an example method for processing packets that have returnable values in respective packet fields.

FIG. 5 is a flowchart of an example method 500 for processing packets that have returnable values in respective packet fields. Specifically, the method 500 illustrates how returnable values of a DNS request can be modified by an intermediary to potentially reduce a computational expense of removing illegitimate DNS responses, such as during a DNS flooding attack. The method 500 can be implemented using the architecture 100, such as described above in reference to FIGS. 1-4. As one example, computer-executable instructions for carrying out the method 500 can be stored in computer-readable memory (e.g., the memory 430) and the instructions can be executed by one or more processor(s) (e.g., the processor 410) to perform the method 500.

At 510, a Domain Name System (DNS) request can be intercepted, where the request includes original returnable request values in respective request packet fields. For example, the original returnable request values can be contained in respective request packet fields including a client port, a DNS query identifier, and a DNS query name. Specifically, the client port can be a transport layer source port. Other packet fields including returnable values can include a source network address. The DNS request can be sent from a DNS client (e.g., the client 140) and addressed to a DNS server (e.g., the DNS server 150). The DNS request can be intercepted by the intermediary server computer 110, for example.

At 520, the respective request packet fields of the DNS request can be updated by replacing an original returnable request value with a replacement value. The replacement value can be selected so that a hash function using the values of the updated respective request packet fields as an input generates a first hash value. For example, the DNS query identifier can be selected so that the hash function produces a constant value (e.g., the first hash value) when the updated respective request packet fields are used as an input to the hash function. As another example, the original request value to be changed can be the domain name. The domain name can include multiple letters and the replacement value can be the domain name where one or more of the letters has a different case than in the original domain name (e.g., website.com can be changed to WebsiTe.COM). A nonce can also be used as an input to the hash function. The nonce can be a value that is generated independently of the values of the returnable fields. For example, the nonce can be a random or pseudorandom number. The nonce and the first hash value can be changed periodically so that a group of DNS requests intercepted during a given period of time use the same nonce and the same hash value.

At 530, the updated DNS request can be forwarded to a DNS server. The updated DNS request can have a combination of the original returnable values and one or more replacement returnable values. The DNS server can process the DNS request and generate a DNS response.

At 540, a DNS response can be received (e.g., at the intermediary server computer 110). The DNS response can include returnable response values in respective response packet fields. The returnable response values of the DNS response can be in the same or different packet fields than the packet fields of the corresponding DNS request. For example, the returnable value in the source port field of the request can be returned in the destination port field of the response. As another example, the returnable value in the DNS query identifier field of the request can be returned in the same field of the response.

At 550, the returnable response values can be used as inputs to the hash function to generate a second hash value. The nonce can also be used as an input to the hash function when generating the second hash value. Legitimate DNS responses will generate the same hash value as their corresponding DNS request. In other words, the first hash value will equal the second hash value for a legitimate DNS response. In contrast, an illegitimate DNS response is likely to generate a hash value that does not match the hash value of a valid DNS request.

At 560, in response to determining the second hash value matches the first hash value, the respective response packet fields of the DNS response can be updated to generate an updated DNS response. For example, updating the packet fields can include replacing the returnable response value of at least one of the respective response packet fields with the original returnable request value. Specifically, the packet field(s) that had replacement value(s) can be updated with the original returnable values of the DNS request.

At optional 570, it can be determined if there is an exact match between the original returnable request values and the updated response values before forwarding the updated DNS response to the client. For example, probabilistically, a hash of the returnable values of an illegitimate DNS response may occasionally match the hash of the returnable values of a DNS request. However, it is much less likely that the original returnable request values of a DNS request and the returnable response values of the illegitimate DNS response will match. By comparing the returnable request values of outstanding requests to the returnable request values of DNS responses, additional illegitimate responses can potentially be dropped.

At 580, the updated DNS response can be forwarded to the client to complete the servicing of the DNS request.

Figure 6:
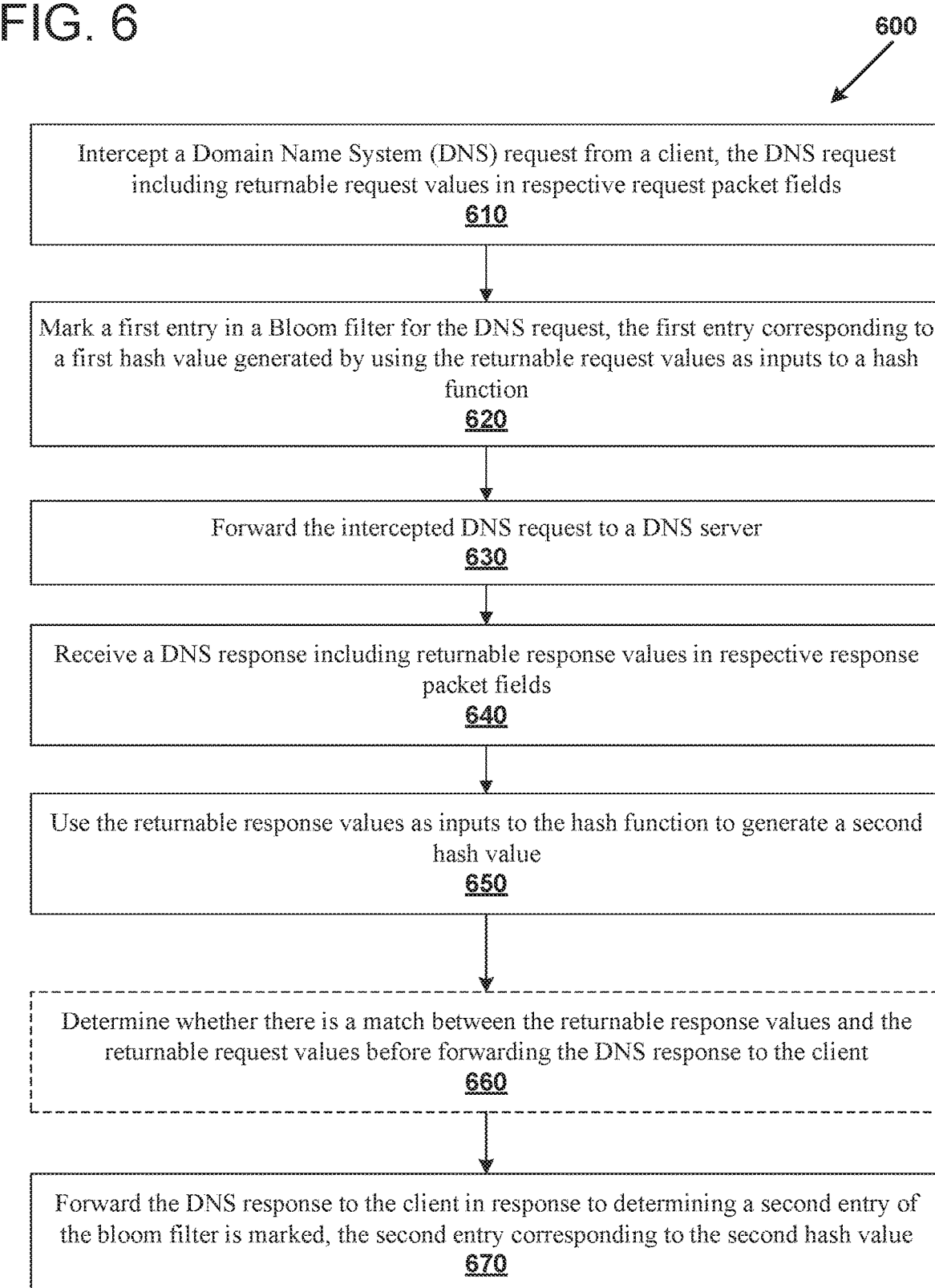
FIG. 6 is a flowchart of an example method for processing packets that have returnable values in respective packet fields.

FIG. 6 is a flowchart of an example method 600 for processing packets that have returnable values in respective packet fields. Specifically, the method 600 illustrates how properties of returnable values of a DNS request can be used by an intermediary to potentially reduce a computational expense of removing illegitimate DNS responses, such as during a DNS flooding attack. The method 600 can be implemented using the architecture 100, such as described above in reference to FIGS. 1-4. As one example, computer-executable instructions for carrying out the method 600 can be stored in computer-readable memory (e.g., the memory 430) and the instructions can be executed by one or more processor(s) (e.g., the processor 410) to perform the method 600.

At 610, a Domain Name System (DNS) request can be intercepted, where the request includes original returnable request values in respective request packet fields. For example, the original returnable request values can be contained in respective request packet fields including a client port, a DNS query identifier, and a DNS query name. Specifically, the client port can be a transport layer source port. Other packet fields including returnable values can include a source network address. The DNS request can be sent from a DNS client (e.g., the client 140) and addressed to a DNS server (e.g., the DNS server 150). The DNS request can be intercepted by the intermediary server computer 110, for example.

At 620, a first entry can be marked in a Bloom filter for the DNS request. The first entry can correspond to a first hash value generated by using the returnable request values as inputs to a hash function. Multiple hash functions can be used for the Bloom filter, so a given DNS request can cause multiple entries to be marked (e.g., one entry per hash function). The Bloom filter can be used for a particular time interval, so that DNS requests arriving within the time interval are recorded in the Bloom filter. A different Bloom filter can be used for a different time interval. By cycling through a group of Bloom filters over different time periods, the marked entries in the Bloom filters can potentially remain relatively sparse so that the illegitimate responses can be more readily distinguished from the legitimate responses. A given Bloom filter can be recycled for a different time period by clearing the entries in the Bloom filter at the start of the new time period.

At 630, the intercepted DNS request can be forwarded to a DNS server. The returnable values of the forwarded DNS request are the same (unmodified) as the original returnable values of the DNS request sent by the DNS client. The DNS server can process the DNS request and generate a DNS response.

At 640, a DNS response can be received (e.g., at the intermediary server computer 110). The DNS response can include returnable response values in respective response packet fields. The returnable response values of the DNS response can be in the same or different packet fields than the packet fields of the corresponding DNS request. For example, the returnable value in the source port field of the request can be returned in the destination port field of the response. As another example, the returnable value in the DNS query identifier field of the request can be returned in the same field of the response.

At 650, the returnable response values can be used as inputs to the hash function to generate a second hash value. Legitimate DNS responses will generate the same hash value as their corresponding DNS request. In other words, the first hash value will equal the second hash value for a legitimate DNS response. In contrast, an illegitimate DNS response is likely to generate a hash value that does not match the hash value of a valid DNS request. When multiple hash functions are used to mark entries of the Bloom filter for a DNS request, the same hash functions will be used to generate hash values for the DNS responses.

At optional 660, it can be determined if there is an exact match between the original returnable request values and the returnable response values before forwarding the updated DNS response to the client. For example, the comparison of the original returnable request values and the returnable response values can be performed after determining a second entry of the bloom filter is marked, where the second entry corresponding to the second hash value. In other words, if the Bloom filter indicates that the DNS response from the DNS server is likely legitimate, then the comparison of the returnable response values can be performed. Probabilistically, a hash of the returnable values of an illegitimate DNS response may occasionally map to a marked entry of the Bloom filter (indicating that a matching DNS request was received). However, it is much less likely that the returnable request values of a DNS request and the returnable response values of the illegitimate DNS response will match. By comparing the returnable request values of outstanding requests to the returnable request values of DNS responses, additional illegitimate responses can potentially be dropped.

At 670, the DNS response can be forwarded to the client in response to determining a second entry of the Bloom filter is marked, where the second entry corresponds to the second hash value. As described above, the marked second entry can indicate that the DNS response is legitimate. If the second entry is not marked, there is no matching DNS request, and the DNS response is likely to be illegitimate and the response can be discarded.

Example Computing Environments

Figure 7:
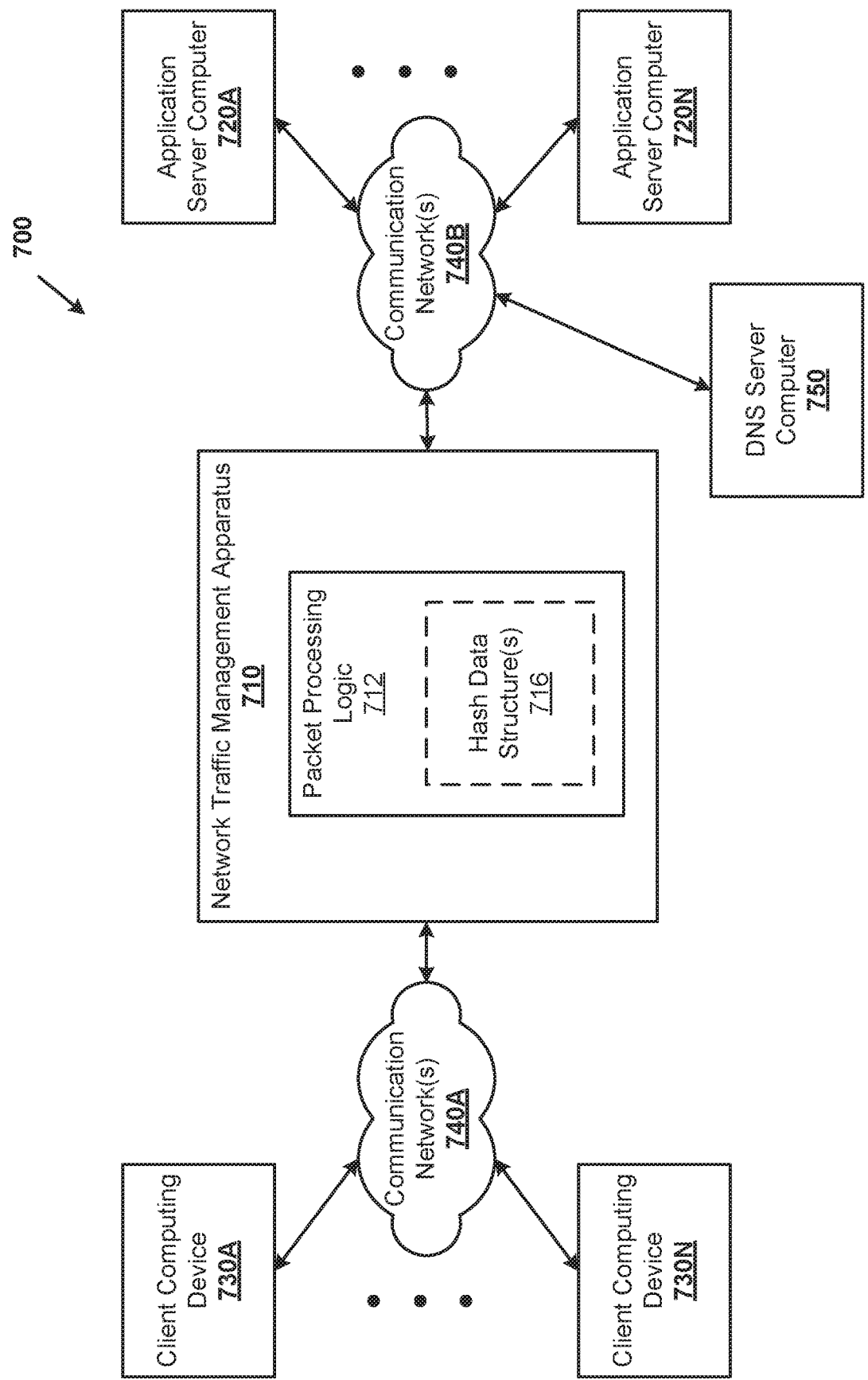
FIG. 7 is a block diagram of an example client-server architecture including packet processing logic.

FIG. 7 illustrates an example client-server architecture 700 (also referred to as a network traffic management system) that incorporates a network traffic management apparatus 710. The client-server architecture 700 includes a network traffic management apparatus 710 that is coupled to one or more server computers (such as application server computers 720A-N and DNS server computer 750) and one or more client devices (such as client computing devices 730A-N) via one or more communication networks (such as the communication networks 740A and 740B). The server computers 720A-N and 750 can communicate with one or more additional server computer(s) that are accessible via the communication networks 740A. As one example, the communication network 740A can include a public network (e.g., the Internet) and devices attached to the network 740A can be accessed using public network addresses; the communication network 740B can include a private network and devices attached to the network 740B can be accessed using private network addresses.

The communication networks 740A-B can include various wired and/or wireless communication technologies, such as a local area network (LAN), a wide area network (WAN), an intranet, the Internet, a public switched telephone network (PSTN), and so forth. The devices connected to the communication networks 740A-B can communicate with each other using various communications protocols, such as transmission control protocol with Internet protocol (TCP/IP) over Ethernet and/or other customized or industry-standard protocols. The communication protocols can be used to transmit information over the networks 740A-B using packet-based messages (e.g., Ethernet-based packet data networks) and/or other application programming interfaces (APIs). An API is a programmatic interface (e.g., a set of methods and/or protocols) for communicating among different modules. The communication networks 740A-B can include various network devices, such as switches (multilayer or single-layer), routers, repeaters, gateways, network bridges, hubs, protocol converters, bridge routers, proxy servers, firewalls, network address translators, multiplexers, network interface controllers, wireless network interface controllers, modems, line drivers, and wireless access points, for example. As illustrated, the network traffic management apparatus 710 is positioned in-line between the client computing devices 730A-N and the server computers 720A-N and 750 so that the network traffic management apparatus 710 can intercept all network traffic flowing between the different networks 740A and 740B. In other examples, the network traffic management apparatus 710, the server computers 720A-N and 750, and the client devices 730A-N can be coupled together via other topologies. As one specific example, the server computers 720A-N can be integrated within the network traffic management system 700 (e.g., server computer functions can be implemented in software within one or more devices of the network traffic management apparatus 710). It should be appreciated by one of ordinary skill in the art having the benefit of the present disclosure, that the network topology illustrated in FIG. 7 has been simplified and that multiple networks and networking devices can be utilized to interconnect the various computing systems disclosed herein. Additionally, one or more of the devices of the client-server architecture 700 in these examples can be in a same or a different communication network including one or more public, private, or cloud networks, for example.

Figure 8:
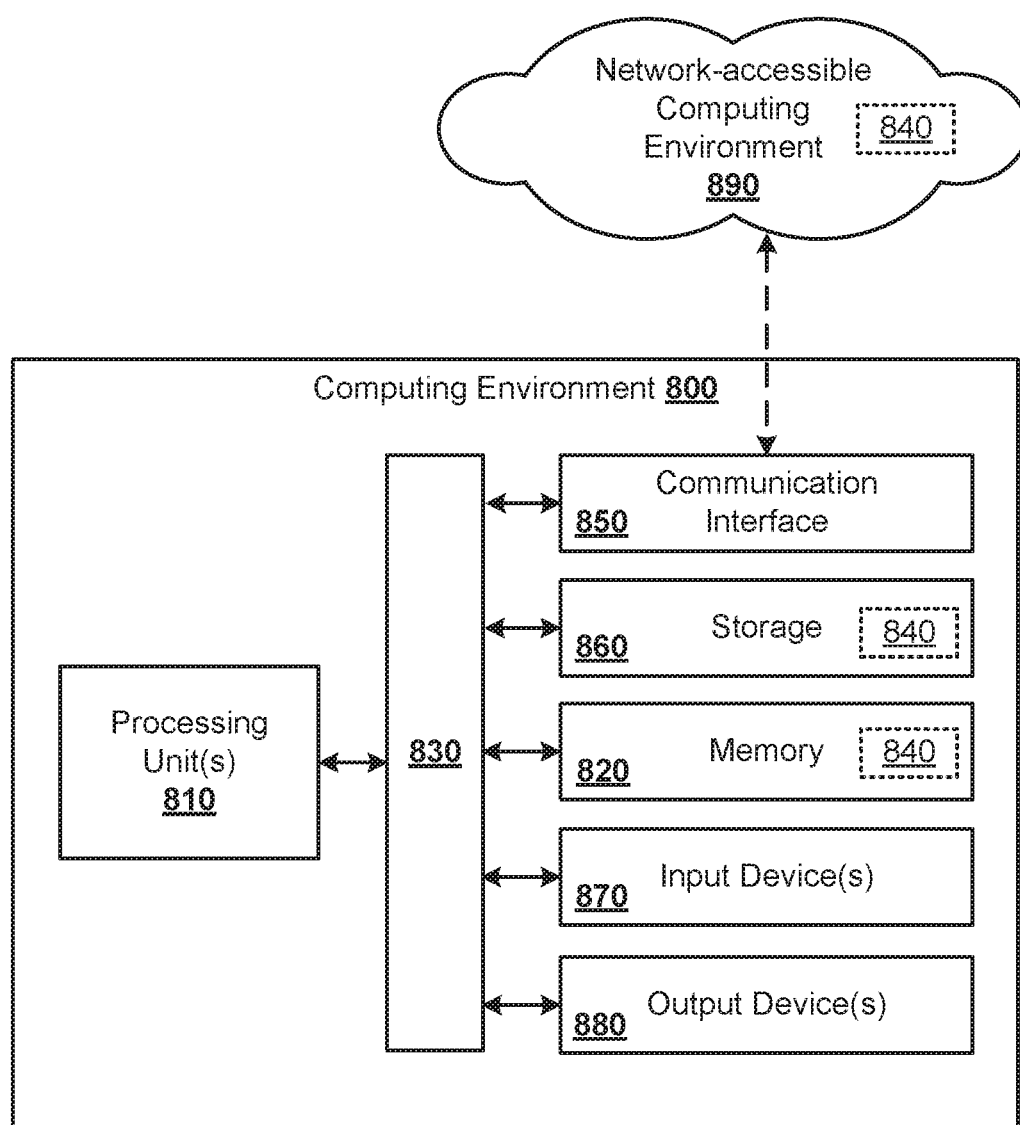
FIG. 8 is a block diagram of an example computing environment, such as can be used for a server computer.

Generally, the server computers 720A-N and 750, the client devices 730A-N, and the network traffic management system 700 can perform various computing tasks that are implemented using a computing environment, such as the computing environment described in more detail with respect to FIG. 8. The computing environment can include computer hardware, computer software, and combinations thereof. As a specific example, the computing environment can include general-purpose and/or special-purpose processor(s), configurable and/or hard-wired electronic circuitry, a communications interface, and computer-readable memory for storing computer-executable instructions to enable the processor(s) to perform a given computing task. The logic to perform a given task can be specified within a single module or interspersed among multiple modules. As used herein, the terms "module" and "component" can refer to an implementation within one or more dedicated hardware devices or apparatus (e.g., computer(s)), and/or an implementation within software hosted by one or more hardware devices or apparatus that may be hosting one or more other software applications or implementations.

The client devices 730A-N can include any type of computing device that can exchange network data, such as mobile communication devices, laptop computers, desktop computers, tablet computers, virtual machines executing within a cloud-computer-based environment, and so forth. The client devices 730A-N can run interface applications, such as web browsers or standalone client applications, which may provide an interface to communicate with (e.g., make requests for, and receive content stored on) one or more of the server computers 720A-N and 750 via the communication network(s) 740A and 740B. The client devices 730A-N can further include an output device (such as a display screen or touchscreen (not illustrated)) and/or an input device (such as a keyboard (not illustrated)). Additionally, one or more of the client devices 730A-N can be configured to execute software code (e.g., JavaScript code within a web browser) in order to log client-side data and provide the logged data to the network traffic management apparatus 710 or the server computers 720A-N.

The server computers 720A-N and 750 can include any type of computing device that can exchange network data. For example, the server computers 720A-N and 750 can exchange network data with the client devices 730A-N and with each other. As another example, the server computers 720A-N can exchange communications along communication paths specified by application logic in order to facilitate a client-server application interacting with the client devices 730A-N. Examples of the server computers 720A-N can include application servers, database servers, access control servers, and encryption servers. Accordingly, in some examples, one or more of the server computers 720A-N process login and other requests received from the client devices 730A-N via the communication network(s) 740A and 740B according to the Hypertext Transfer Protocol (HTTP) or Hypertext Transfer Protocol Secure (HTTPS) application-layer protocol. A web application may be operating on one or more of the server computers 720A-N and transmitting data (e.g., files or web pages) to the client devices 730A-N (e.g., via the network traffic management apparatus 710) in response to requests from the client devices 730A-N. The server computers 720A-N can be hardware and/or software and may represent a system with multiple servers in a pool, which may include internal or external networks. The server computer 750 can execute a DNS server application.

While the server computers 720A-N and 750 are illustrated as single devices, one or more actions of each of the server computers 720A-N and 750 may be distributed across one or more distinct network computing devices that together comprise one or more of the server computers 720A-N and 750. Moreover, the server computers 720A-N and 750 are not limited to a particular configuration. Thus, the server computers 720A-N and 750 may contain network computing devices that operate using a coordinated approach, whereby one of the network computing devices of the server computers 720A-N and 750 operate to manage or otherwise coordinate operations of the other network computing devices. Each of the server computers 720A-N and 750 can operate as a networked computing device within a cluster architecture, a computing device within a peer-to-peer architecture, a virtual machine, or a resource within a cloud-based computer architecture, for example. Thus, the technology disclosed herein is not to be construed as being limited to a single environment and other configurations and architectures are also envisaged. For example, one or more of the server computers 720A-N and 750 can operate within the network traffic management apparatus 710 itself rather than as a stand-alone server device communicating with the network traffic management apparatus 710 via communication network 740B. In this example, the one or more of the server computers 720A-N and 750 operate within the memory of the network traffic management apparatus 710.

The network traffic management apparatus 710 can include any type of computing device that can be used for managing network traffic. The network traffic management apparatus 710 can perform a number of functions, including providing network security, access control, load balancing network traffic across the server computers 720A-N, and/or accelerating network traffic associated with an application hosted by one or more of the server computers 720A-N, for example. Each of the functions can be performed by a service. The services can be incorporated into workloads that are executed by the network traffic management apparatus 710 For example, the network traffic management apparatus 710 can include a workload that is used to perform proxy and other services on behalf of the server 720A-N and to manage traffic between the clients 730A-N and the servers 720A-N. Additionally, the network traffic management apparatus 710 can include other network devices such as one or more routers or switches, for example.

The network traffic management apparatus 710 can include packet processing logic 712 and hash data structures 716 as described above with reference to FIGS. 1-6. For example, the packet processing logic 712 can intercept DNS requests and DNS responses. The intercepted DNS requests can be forwarded, modified or unmodified, to the DNS server computer 750. The packet processing logic 712 and the hash data structures 716 can be used to distinguish legitimate DNS responses from illegitimate DNS responses. DNS responses that are determined to be legitimate can be forwarded, modified or unmodified, to the client devices 730A-N. DNS responses that are determined to be illegitimate can be discarded.

While the network traffic management apparatus 710 is illustrated in this example as including a single device, the network traffic management apparatus 710 in other examples can include a plurality of devices or blades each having one or more processors (each processor with one or more processing cores) that implement one or more components of this technology. In these examples, one or more of the devices can have a dedicated communication interface or memory. Alternatively, one or more of the devices can utilize the memory, communication interface, or other hardware or software components of one or more other devices included in the network traffic management apparatus 710. Additionally, the network traffic management apparatus 710 and/or the application(s) executed by the network traffic management apparatus 710 can be operative in a cloud-based computing environment. The application(s) can be executed within or as virtual machine(s) or virtual server(s) that can be managed in a cloud-based computing environment. For example, the application(s), and even the network traffic management apparatus 710 itself, can be located in virtual server(s) running in a cloud-based computing environment rather than being tied to one or more specific physical network computing devices. Also, the application(s) can be running in one or more virtual machines (VMs) executing on the network traffic management apparatus 710. Additionally, in one or more examples of this technology, virtual machine(s) running on the network traffic management apparatus 710 can be managed or supervised by a hypervisor. Additionally, one or more of the components that together comprise the network traffic management apparatus 710 can be standalone devices or integrated with one or more other devices or apparatuses, such as with one or more of the server computers 720A-N, for example.

Additionally, one or more of the components depicted in the client-server architecture 700, such as the network traffic management apparatus 710, server computers 720A-N, or client computing devices 730A-N, for example, may be configured to operate as virtual instances on the same physical machine. In other words, one or more of the network traffic management apparatus 710, server computers 720A-N, or client computing devices 730A-N may operate on the same physical device rather than as separate devices communicating through communication networks 740A and 740B. Additionally, there may be more or fewer network traffic management apparatuses, client computing devices, or server computers than illustrated in FIG. 7.

FIG. 8 illustrates a block diagram of a generalized example of a suitable computing environment 800 that can be used to implement the examples, techniques, and technologies described herein. For example, the computing environment 800 can be used to implement a network traffic management apparatus including an intermediary server that performs the disclosed techniques for processing packets having returnable values.

The computing environment 800 includes at least one processing unit 810 and computer-readable memory 820, which are coupled together by an interconnect 830. The processing unit 810 executes computer-executable instructions. The processing unit 810 can include a general-purpose processor, a special-purpose processor, and combinations thereof. For example, the processing unit 810 can include a general-purpose central processing unit (CPU), a graphics processor, a processor in an application-specific integrated circuit (ASIC), a processor configured to operate using programmable logic (such as in a field-programmable gate array (FPGA)), and/or any other type of processor. In a multi-processing system, multiple processing units can be used to execute computer-executable instructions to increase processing power.

The memory 820 stores software 840 implementing one or more innovations described herein, in the form of computer-executable instructions suitable for execution by the processing unit 810. Specifically, the memory 820 can be used to store computer-executable instructions, data structures, input data, output data, and other information. The memory 820 can include volatile memory (e.g., registers, cache, random-access memory (RAM)), non-volatile memory (e.g., read-only memory (ROM), electrically-erasable programmable ROM (EEPROM), and flash memory), and/or combinations thereof. The memory 820 can include operating system software (not illustrated). Operating system software can provide an operating environment for other software executing in the computing environment 800 and can coordinate activities of the components of the computing environment 800.

The interconnect 830 is used to connect different components of the computing environment 800 together so that the processing unit 810 can communicate with the different components and/or so that the different components can communicate with each other. For example, the interconnect 830 can include a bus, controller, and/or a network. As one example, the interconnect 830 can include a host bridge (also referred to as a northbridge) for connecting the processing unit 810 to relatively high-speed components (such as the memory 820) and an input/output bridge (also referred to as a southbridge) for connecting to relatively lower-speed components (such as a communications interface 850) within the computing environment 800. In some examples, one or more components of the computing environment 800 can be integrated within or connected directly to the processing unit 810.

The computing environment 800 can include a communication interface 850 for communicating with another computing entity using a communication medium (e.g., a physical layer). The communication interface 850 can implement all or a portion of a network protocol stack. The network protocol stack defines communication formats and rules for communicating between different devices connected to a network. For example, the network protocol stack can define modular layers for communication using the Open Systems Interconnection (OSI) model or another model. The OSI model standardizes and partitions a communication system into seven layers including a physical layer (referred to as layer 1) and an application layer (referred to as layer 7). The application layer can be used to define how applications access the communications subsystem. The physical layer defines the electrical and physical specifications for communication over a communication medium (also referred to as a physical transmission medium). The communication medium can be used to convey information, such as computer-executable instructions or other data, in a modulated data signal. A modulated data signal is a signal that has one or more of its characteristics adjusted in such a manner as to encode information in the signal. The communication interface 850 can include electronic and/or optical circuitry to receive and transmit communications signals that are encoded (e.g., according to a physical layer specification of the network stack) using an electrical, optical, radio-frequency (RF), or another carrier signal. Accordingly, the communication interface 850 can be used to communicate over wired connections (e.g., twisted-wire pair, coaxial cable, and fiber optic connections) and/or wireless technologies (e.g., Bluetooth, WiFi (IEEE 802.11), and cellular). As a specific example with reference to FIG. 7, a communication interface of the network traffic management apparatus 710 operatively couples to and communicates with the communication networks 740A and 740B so that the network traffic management apparatus 710 is coupled to and can communicate with the server computers 720A-N and the client computing devices 730A-N.

The computing environment 800 can include storage 860 that is used to store instructions for the software 840, data structures, and data, which can be used to implement the technologies described herein. The storage 860 can include electronic circuitry for reading and/or writing to removable or non-removable storage media using magnetic, optical, or other reading and writing system that is coupled to the processor. The storage 860 can include read-only storage media and/or readable and writeable storage media, such as magnetic disks, solid state drives, magnetic tapes or cassettes, CD-ROMs, CD-RWs, DVDs, or any other medium which can be used to store information and that can be accessed within the computing environment 800.

The computing environment 800 can include input device(s) 870. For example, the input device(s) 870 can provide an input interface to a user of the computing environment 800 and/or to receive inputs from a physical environment. The input device(s) 870 can include a tactile input device (e.g., a keyboard, a mouse, or a touchscreen), a microphone, a camera, a sensor, or another device that provides input to the computing environment 800.

The computing environment 800 can include output device(s) 880. For example, the output device(s) 880 can provide an output interface to a user of the computing environment 800 and/or to generate an output observable in a physical environment. The output device(s) 880 can include a light-emitting diode, a display, a printer, a speaker, a CD-writer, or another device that provides output from the computing environment 800. In some examples, the input device(s) 870 and the output device(s) 880 can be used together to provide a user interface to a user of the computing environment 800.

The computing environment 800 is not intended to suggest limitations as to scope of use or functionality of the technology, as the technology can be implemented in diverse general-purpose and/or special-purpose computing environments. For example, the disclosed technology can be practiced in a local, distributed, and/or network-enabled computing environment. In distributed computing environments, tasks are performed by multiple processing devices. Accordingly, principles and advantages of distributed processing, such as redundancy, parallelization, and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof. As a specific example, a distributed computing environment can include the processing unit 810 and the network-accessible computing environment 890 that is linked through a communications network. In a distributed computing environment, program modules 840 (including executable instructions for processing packets with returnable values) can be located in both local and remote memory storage devices.

The term computer-readable media includes non-transient media for data storage, such as memory 820 and storage 860, and does not include transmission media such as modulated data signals and carrier waves. Any of the disclosed methods can be implemented as computer-executable instructions stored on one or more computer-readable media and executed on a computer (e.g., any commercially available computer). Any of the computer-executable instructions for implementing the disclosed techniques as well as any data structures and data created and used during implementation of the disclosed embodiments can be stored on one or more computer-readable storage media. For example, the computer-executable instructions can be part of a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, or other such network) using one or more network-attached computers.

This disclosure is set forth in the context of representative examples that are not intended to be limiting. Accordingly, this disclosure is directed toward all novel and non-obvious features and aspects of the various disclosed examples, alone and in various combinations and sub-combinations with one another. Many variations of the specific hardware and software used to implement the examples are possible, as will be appreciated by those skilled in the relevant art with the benefit of this disclosure. The disclosed systems, methods, and apparatus are not limited to any specific aspect or feature or combinations thereof, nor does the disclosed technology require that any one or more specific advantages be present or problems be solved. Theories of operation, scientific principles, or other theoretical descriptions presented herein in reference to the disclosed technology have been provided for the purposes of better understanding and are not intended to be limiting in scope. The apparatus and methods in the appended claims are not limited to those apparatus and methods that function in the manner described by such theories of operation.

As used in this application the singular forms "a," "an," and "the" include the plural forms unless the context clearly dictates otherwise. The term "coupled" encompasses mechanical, electrical, magnetic, optical, as well as other practical ways of coupling or linking items together, and does not exclude the presence of intermediate elements between the coupled items. The term "and/or" means any one item or combination of items in the phrase.

The recited order of processing elements or sequences, or the use of numbers, letters, or other designations therefore, is not intended to limit the claimed processes to any order. Although the operations of some of the disclosed methods are described in a particular, sequential order for convenient presentation, it should be understood that this manner of description encompasses rearrangement, unless a particular ordering is required by specific claim language set forth below. For example, operations described sequentially may in some cases be rearranged or performed concurrently. Moreover, for the sake of simplicity, the attached figures may not show all of the various ways in which the disclosed methods can be used in conjunction with other methods.

It should also be well understood that any software functionality described herein can be performed, at least in part, by one or more hardware logic components, instead of software. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), and so forth.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, Java, or any other suitable programming language. Likewise, the disclosed technology is not limited to any particular computer or type of hardware. Certain details of suitable computers and hardware are well-known and need not be set forth in detail in this disclosure.

Having thus described many possible embodiments to which the principles of the invention may be applied, it will be recognized by those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the scope of the claimed subject matter is defined by the following claims. We therefore claim as our invention all that comes within the scope of these claims.

What is claimed is:

1. A method implemented by a network traffic management system comprising one or more network traffic management apparatuses, server devices, or client devices, the method comprising:
intercepting a Domain Name System (DNS) request comprising original returnable request values in respective request packet fields, wherein the respective request packet fields containing the original returnable request values comprise a DNS query identifier and a DNS query name;
updating the respective request packet fields of the DNS request by replacing an original returnable request value with a replacement value, the replacement value selected so that a hash function using the values of the updated respective request packet fields as an input generates a first hash value;
forwarding the updated DNS request to a DNS server;
receiving a DNS response comprising returnable response values in respective response packet fields;
using the returnable response values as inputs to the hash function to generate a second hash value;
in response to determining the second hash value matches the first hash value, updating the respective response packet fields of the DNS response, by replacing the returnable response value of at least one of the respective response packet fields with the original returnable request value, to generate an updated DNS response;
determining there is an exact match between the original returnable request values and the updated response values of the updated DNS response before forwarding the updated DNS response to the client; and
forwarding the updated DNS response to a client.

2. The method of claim 1, wherein a returnable request value is a value that is sent in a given request and is returned unchanged in a response to the given request.

3. The method of claim 1, wherein the first hash value is used for a first plurality of DNS requests intercepted during a given period of time, and a different hash value is used for a second plurality of DNS requests intercepted during a subsequent period of time.

4. The method of claim 1, wherein the original request value is a domain name comprising a plurality of letters and the replacement value is the domain name where a case of at least one letter of the plurality of letters is changed.

5. The method of claim 1, wherein the first hash value and the second hash value are generated using a nonce value as an input to the hash function, the nonce value being a value that is generated independently of the values of the returnable fields.

6. A system comprising one or more network traffic management modules, networking modules, or server modules, memory comprising programmed instructions stored thereon, and one or more processors configured to be capable of executing the stored programmed instructions to:
intercept a Domain Name System (DNS) request comprising original returnable request values in respective request packet fields, wherein the respective request packet fields containing the original returnable request values comprise a DNS query identifier and a DNS query name;
update the respective request packet fields of the DNS request by replacing an original returnable request value with a replacement value, the replacement value selected so that a hash function using the values of the updated respective request packet fields as an input generates a first hash value;
forward the updated DNS request to a DNS server;
receive a DNS response comprising returnable response values in respective response packet fields;
use the returnable response values as inputs to the hash function to generate a second hash value;
in response to determining the second hash value matches the first hash value, update the respective response packet fields of the DNS response, by replacing the returnable response value of at least one of the respective response packet fields with the original returnable request value, to generate an updated DNS response;
determine there is an exact match between the original returnable request values and the updated response values of the updated DNS response before forwarding the updated DNS response to the client; and
forward the updated DNS response to a client.

7. The system of claim 6, wherein the first hash value is used for a first plurality of DNS requests intercepted during a given period of time, and a different hash value is used for a second plurality of DNS requests intercepted during a subsequent period of time.

8. The system of claim 6, wherein the original request value is a domain name comprising a plurality of letters and the replacement value is the domain name where a case of at least one letter of the plurality of letters is changed.

9. The system of claim 6, wherein the first hash value and the second hash value are generated using a nonce value as an input to the hash function, the nonce value being a value that is generated independently of the values of the returnable fields.

10. A non-transitory computer readable medium having stored thereon instructions comprising executable code that, when executed by one or more processors, causes the processors to:
intercept a Domain Name System (DNS) request comprising original returnable request values in respective request packet fields, wherein the respective request packet fields containing the original returnable request values comprise a DNS query identifier and a DNS query name;
update the respective request packet fields of the DNS request by replacing an original returnable request value with a replacement value, the replacement value selected so that a hash function using the values of the updated respective request packet fields as an input generates a first hash value;
forward the updated DNS request to a DNS server;
receive a DNS response comprising returnable response values in respective response packet fields;
use the returnable response values as inputs to the hash function to generate a second hash value;
in response to determining the second hash value matches the first hash value, update the respective response packet fields of the DNS response, by replacing the returnable response value of at least one of the respective response packet fields with the original returnable request value, to generate an updated DNS response;

determine there is an exact match between the original returnable request values and the updated response values of the updated DNS response before forwarding the updated DNS response to the client; and forward the updated DNS response to a client.

11. The computer readable medium of claim 10, wherein the first hash value is used for a first plurality of DNS requests intercepted during a given period of time, and a different hash value is used for a second plurality of DNS requests intercepted during a subsequent period of time.

12. The computer readable medium of claim 10, wherein the first hash value and the second hash value are generated using a nonce value as an input to the hash function, the nonce value being a value that is generated independently of the values of the returnable fields.

13. The computer readable medium of claim 10, wherein the original request value is a domain name comprising a plurality of letters and the replacement value is the domain name where a case of at least one letter of the plurality of letters is changed.

14. A network traffic management apparatus, comprising memory comprising programmed instructions stored thereon and one or more processors configured to be capable of executing the stored programmed instructions to:

intercept a Domain Name System (DNS) request comprising original returnable request values in respective request packet fields, wherein the respective request packet fields containing the original returnable request values comprise a DNS query identifier and a DNS query name;

update the respective request packet fields of the DNS request by replacing an original returnable request value with a replacement value, the replacement value selected so that a hash function using the values of the updated respective request packet fields as an input generates a first hash value;

forward the updated DNS request to a DNS server;

receive a DNS response comprising returnable response values in respective response packet fields;

use the returnable response values as inputs to the hash function to generate a second hash value;

in response to determining the second hash value matches the first hash value, update the respective response packet fields of the DNS response, by replacing the returnable response value of at least one of the respective response packet fields with the original returnable request value, to generate an updated DNS response;

determine there is an exact match between the original returnable request values and the updated response values of the updated DNS response before forwarding the updated DNS response to the client; and forward the updated DNS response to a client.

15. The network traffic management apparatus of claim 14, wherein the first hash value is used for a first plurality of DNS requests intercepted during a given period of time, and a different hash value is used for a second plurality of DNS requests intercepted during a subsequent period of time.

16. The network traffic management apparatus of claim 14, wherein the first hash value and the second hash value are generated using a nonce value as an input to the hash function, the nonce value being a value that is generated independently of the values of the returnable fields.

17. The network traffic management apparatus of claim 14, wherein the original request value is a domain name comprising a plurality of letters and the replacement value is the domain name where a case of at least one letter of the plurality of letters is changed.

* * * * *